(12) United States Patent
Bernier et al.

(10) Patent No.: US 12,392,902 B2
(45) Date of Patent: *Aug. 19, 2025

(54) BEAM-STEERING DEVICE PARTICULARLY FOR LIDAR SYSTEMS

(71) Applicant: LeddarTech Inc., Quebec (CA)

(72) Inventors: Jean-Francois Bernier, Quebec (CA); Pierre Olivier, Saint-Rédempteur (CA); Dominique Bodziany, Quebec (CA)

(73) Assignee: LeddarTech Inc., Quebec City (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,434

(22) Filed: Oct. 12, 2023

(65) Prior Publication Data

US 2024/0061125 A1 Feb. 22, 2024

Related U.S. Application Data

(63) Continuation of application No. 17/382,163, filed on Jul. 21, 2021, now Pat. No. 11,828,853.

(Continued)

(51) Int. Cl.
*G01S 17/93* (2020.01)
*G01S 7/481* (2006.01)
*G01S 7/4865* (2020.01)
*G01S 7/497* (2006.01)
*G01S 17/32* (2020.01)
(Continued)

(52) U.S. Cl.
CPC ............ *G01S 17/93* (2013.01); *G01S 7/4817* (2013.01); *G01S 7/4865* (2013.01); *G01S 7/497* (2013.01); *G01S 17/32* (2013.01); *G01S 17/86* (2020.01); *G01S 17/89* (2013.01)

(58) Field of Classification Search
None
See application file for complete search history.

(56) References Cited

U.S. PATENT DOCUMENTS 3,045,231 A 7/1962 Emory
3,954,335 A 5/1976 Bodlaj
(Continued)

FOREIGN PATENT DOCUMENTS

CA 2710212 7/2009
CA 2782180 6/2011
(Continued)

OTHER PUBLICATIONS

Akindinov et al., Detection of Light Pulses Using an Avalanche Photodiode Array with a Metal-Resistor-Semiconductor Structure, Instruments and Experimental Techniques, Nov. 2004, vol. 48, No. 3, 205, pp. 355-363, Russia.

(Continued)

*Primary Examiner* — Yuqing Xiao
*Assistant Examiner* — Jempson Noel
(74) *Attorney, Agent, or Firm* — Fish & Richardson P.C.

(57) ABSTRACT

A LIDAR apparatus for scanning a scene, comprising a transmitter stage, a receiver stage, a beam-steering engine configured to steer the light beam received from the transmitter stage in different directions to scan at least a portion of the scene, the beam-steering engine being responsive to steering commands to produce corresponding deflections of the light beam and an operation monitor for monitoring a beam-steering function of the beam-steering engine.

20 Claims, 31 Drawing Sheets

Related U.S. Application Data

(60) Provisional application No. 63/145,795, filed on Feb. 4, 2021, provisional application No. 63/136,765, filed on Jan. 13, 2021, provisional application No. 63/054,634, filed on Jul. 21, 2020.

(51) Int. Cl.
    *G01S 17/86*     (2020.01)
    *G01S 17/89*     (2020.01)

(56) References Cited

U.S. PATENT DOCUMENTS

| | | |
|---|---|---|
| 5,126,869 A | 6/1992 | Lipchak |
| 5,128,874 A | 7/1992 | Bhanu et al. |
| 5,195,144 A | 3/1993 | Parquier et al. |
| 5,198,657 A | 3/1993 | Trost et al. |
| 5,298,905 A | 3/1994 | Dahl |
| 5,396,510 A | 3/1995 | Wilson |
| 5,471,215 A | 11/1995 | Fukuhara |
| 5,565,870 A | 10/1996 | Fukuhara |
| 5,587,908 A | 12/1996 | Kajiwara |
| 5,633,901 A | 5/1997 | Bottman |
| 5,699,151 A | 12/1997 | Akasu |
| 5,745,806 A | 4/1998 | Saito |
| 5,812,249 A | 9/1998 | Johnson et al. |
| 5,831,717 A | 11/1998 | Ikebuchi |
| 5,852,491 A | 12/1998 | Kato |
| 5,870,178 A | 2/1999 | Egawa |
| 5,896,103 A | 4/1999 | Bunch |
| 5,923,417 A | 7/1999 | Leis |
| 5,933,225 A | 8/1999 | Yamabuchi |
| 5,987,395 A | 11/1999 | Donges |
| 6,100,539 A | 8/2000 | Blumcke |
| 6,115,112 A | 9/2000 | Hertzman |
| 6,115,114 A | 9/2000 | Berg et al. |
| 6,252,655 B1 | 6/2001 | Tanaka |
| 6,323,941 B1 | 11/2001 | Evans et al. |
| 6,502,053 B1 | 12/2002 | Hardin et al. |
| 6,522,393 B2 | 2/2003 | Higashino |
| 6,553,130 B1 | 4/2003 | Lemelson et al. |
| 6,587,185 B1 | 7/2003 | Ide |
| 6,606,054 B2 | 8/2003 | Okamura |
| 6,650,403 B2 | 11/2003 | Ogawa |
| 6,657,704 B2 | 12/2003 | Shirai |
| 6,665,057 B2 | 12/2003 | Schellmann |
| 6,710,859 B2 | 3/2004 | Shirai |
| 6,765,495 B1 | 7/2004 | Dunning et al. |
| 6,829,043 B2 | 12/2004 | Lewis |
| 6,847,462 B1 | 1/2005 | Kacyra et al. |
| 6,850,156 B2 | 2/2005 | Bloomfield et al. |
| 6,897,465 B2 | 5/2005 | Remillard |
| 6,989,781 B2 | 1/2006 | Steinbuch |
| 7,023,531 B2 | 4/2006 | Gogolla |
| 7,068,214 B2 | 6/2006 | Kakishita |
| 7,177,014 B2 | 2/2007 | Mori |
| 7,221,271 B2 | 5/2007 | Reime |
| 7,350,945 B2 | 4/2008 | Albou et al. |
| 7,385,626 B2 | 6/2008 | Aggarwal et al. |
| 7,417,718 B2 | 8/2008 | Wada et al. |
| 7,508,496 B2 | 3/2009 | Mettenleiter et al. |
| 7,619,754 B2 | 11/2009 | Reil et al. |
| 7,852,461 B2 | 12/2010 | Yahav |
| 7,957,639 B2 | 6/2011 | Lee et al. |
| 7,957,900 B2 | 6/2011 | Chowdhary et al. |
| 8,045,249 B2 | 10/2011 | Kobayashi et al. |
| 8,189,051 B2 | 5/2012 | Shih et al. |
| 8,290,208 B2 | 10/2012 | Kurtz et al. |
| 8,446,492 B2 | 5/2013 | Nakano et al. |
| 8,457,827 B1 | 6/2013 | Ferguson et al. |
| 8,547,374 B1 | 10/2013 | Sadjadi et al. |
| 8,548,229 B2 | 10/2013 | Badino et al. |
| 8,587,686 B1 | 11/2013 | Riza et al. |
| 8,723,717 B2 | 5/2014 | Saito |
| 8,736,818 B2 | 5/2014 | Weimer |
| 8,761,594 B1 | 6/2014 | Gross et al. |
| 8,791,851 B2 | 7/2014 | Elad et al. |
| 8,908,159 B2 | 12/2014 | Mimeault |
| 8,982,313 B2 | 3/2015 | Escuti et al. |
| 8,996,224 B1 | 3/2015 | Herbach |
| 9,063,549 B1 | 6/2015 | Pennecot |
| 9,098,754 B1 | 8/2015 | Stout |
| 9,164,511 B1 | 10/2015 | Ferguson et al. |
| 9,188,980 B2 | 11/2015 | Anderson |
| 9,774,789 B2 | 9/2017 | Ciurea |
| RE46,930 E | 7/2018 | Mimeault |
| 10,098,727 B1 | 10/2018 | Galstian |
| RE47,134 E | 11/2018 | Mimeault |
| 10,191,156 B2 | 1/2019 | Steinberg et al. |
| 10,412,368 B2 | 9/2019 | Osterwood |
| 10,571,552 B1 | 2/2020 | Gao |
| 10,825,010 B2 | 11/2020 | Olmstead |
| 10,832,438 B2 | 11/2020 | Gozu |
| 10,884,278 B2 | 1/2021 | Hegyi |
| 11,022,857 B2 | 6/2021 | Lee |
| 11,061,406 B2 | 7/2021 | Mao |
| 11,087,494 B1 | 8/2021 | Srinivasan |
| 11,828,853 B2 | 11/2023 | Bernier |
| 2001/0024271 A1 | 9/2001 | Takayanagi |
| 2001/0045981 A1 | 11/2001 | Gloger et al. |
| 2002/0097995 A1 | 7/2002 | Nakata |
| 2002/0141618 A1 | 10/2002 | Ciolli |
| 2003/0193642 A1 | 10/2003 | Tominaga et al. |
| 2004/0035620 A1 | 2/2004 | McKeeferey |
| 2004/0036834 A1* | 2/2004 | Ohnishi ............ H04N 5/7441 349/177 |
| 2004/0135992 A1 | 7/2004 | Munro |
| 2004/0164946 A1 | 8/2004 | Cavanaugh et al. |
| 2005/0041020 A1 | 2/2005 | Roes et al. |
| 2005/0117364 A1 | 6/2005 | Rennick et al. |
| 2005/0200832 A1 | 9/2005 | Kawai et al. |
| 2005/0269481 A1 | 12/2005 | David et al. |
| 2006/0072099 A1 | 4/2006 | Hoashi |
| 2006/0147089 A1 | 7/2006 | Han et al. |
| 2006/0149472 A1 | 7/2006 | Han et al. |
| 2006/0186702 A1 | 8/2006 | Kisanuki et al. |
| 2006/0274545 A1 | 12/2006 | Rosenstein |
| 2006/0274918 A1 | 12/2006 | Amantea et al. |
| 2007/0024841 A1 | 2/2007 | Kloza |
| 2007/0070480 A1* | 3/2007 | Mahajan ............ G02B 26/0883 359/201.1 |
| 2007/0091294 A1 | 4/2007 | Hipp |
| 2007/0097349 A1 | 5/2007 | Wada |
| 2007/0165967 A1 | 7/2007 | Ando |
| 2007/0181810 A1 | 8/2007 | Tan |
| 2007/0187573 A1 | 8/2007 | Aoki |
| 2007/0189455 A1 | 8/2007 | Allison |
| 2007/0255525 A1 | 11/2007 | Lee |
| 2008/0046150 A1 | 2/2008 | Breed |
| 2008/0077327 A1 | 3/2008 | Harris |
| 2008/0199165 A1 | 8/2008 | Ng et al. |
| 2008/0297870 A1 | 12/2008 | Kobayashi et al. |
| 2009/0102699 A1 | 4/2009 | Behrens et al. |
| 2009/0109082 A1 | 4/2009 | Rose |
| 2009/0251680 A1 | 10/2009 | Farsaie |
| 2010/0014781 A1 | 1/2010 | Liu et al. |
| 2010/0040285 A1 | 2/2010 | Csurka et al. |
| 2010/0091263 A1 | 4/2010 | Kumagai |
| 2010/0157280 A1 | 6/2010 | Kusevic |
| 2010/0191117 A1 | 7/2010 | Kabakov |
| 2010/0204974 A1 | 8/2010 | Israelsen |
| 2010/0211247 A1 | 8/2010 | Sherony |
| 2010/0235129 A1 | 9/2010 | Sharma |
| 2010/0245535 A1 | 9/2010 | Mauchly |
| 2010/0315618 A1 | 12/2010 | Hertzman |
| 2011/0026008 A1 | 2/2011 | Gammenthaler |
| 2011/0081043 A1 | 4/2011 | Sabol |
| 2011/0134249 A1 | 6/2011 | Wood et al. |
| 2011/0141306 A1 | 6/2011 | Nakano et al. |
| 2011/0292406 A1 | 12/2011 | Hollenbeck et al. |
| 2011/0310085 A1 | 12/2011 | Mimura et al. |
| 2012/0021595 A1 | 1/2012 | Kim |
| 2012/0026510 A1 | 2/2012 | Crampton et al. |
| 2012/0035788 A1 | 2/2012 | Trepagnier |

(56) References Cited

U.S. PATENT DOCUMENTS

| | | |
|---|---|---|
| 2012/0038902 A1 | 2/2012 | Dotson |
| 2012/0044093 A1 | 2/2012 | Pala |
| 2012/0044476 A1 | 2/2012 | Earhart et al. |
| 2012/0148100 A1 | 6/2012 | Kotake et al. |
| 2012/0188467 A1* | 7/2012 | Escuti ............... G02F 1/1347 349/1 |
| 2012/0206627 A1 | 8/2012 | Reschidko et al. |
| 2012/0214037 A1 | 8/2012 | Hara et al. |
| 2012/0229304 A1 | 9/2012 | Dalal |
| 2012/0310518 A1 | 12/2012 | Chen et al. |
| 2012/0326959 A1 | 12/2012 | Murthi et al. |
| 2013/0021595 A1 | 1/2013 | Guetta |
| 2013/0050430 A1 | 2/2013 | Lee |
| 2013/0107065 A1 | 5/2013 | Venkatraman et al. |
| 2013/0174102 A1 | 7/2013 | Leu |
| 2014/0077988 A1 | 3/2014 | Saito |
| 2014/0078263 A1 | 3/2014 | Kim |
| 2014/0094307 A1 | 4/2014 | Doolittle et al. |
| 2014/0118716 A1 | 5/2014 | Kaganovich |
| 2014/0132722 A1 | 5/2014 | Bauza et al. |
| 2014/0139639 A1 | 5/2014 | Wagner et al. |
| 2014/0240464 A1 | 8/2014 | Lee |
| 2014/0267631 A1 | 9/2014 | Powers |
| 2014/0280230 A1 | 9/2014 | Masato et al. |
| 2014/0358429 A1 | 12/2014 | Shutko |
| 2015/0071541 A1 | 3/2015 | Qutub et al. |
| 2015/0285912 A1 | 10/2015 | Hammes |
| 2015/0310273 A1 | 10/2015 | Shreve |
| 2015/0340875 A1 | 11/2015 | Prasad et al. |
| 2015/0356357 A1 | 12/2015 | McManus et al. |
| 2015/0362587 A1 | 12/2015 | Rogan |
| 2015/0379766 A1 | 12/2015 | Newman |
| 2016/0018526 A1 | 1/2016 | Van Den Bossche |
| 2016/0047903 A1* | 2/2016 | Dussan ............... G01S 17/931 356/5.01 |
| 2016/0104289 A1 | 4/2016 | Chang |
| 2016/0144695 A1 | 5/2016 | Higgins |
| 2016/0180530 A1 | 6/2016 | Friend |
| 2016/0214607 A1 | 7/2016 | Dolgov et al. |
| 2016/0295196 A1 | 10/2016 | Finn |
| 2017/0003392 A1 | 1/2017 | Bartlett et al. |
| 2017/0124781 A1 | 5/2017 | Douillard |
| 2017/0160600 A1 | 6/2017 | Galstian et al. |
| 2017/0246990 A1 | 8/2017 | Rosenblum |
| 2017/0269198 A1 | 9/2017 | Hall et al. |
| 2017/0328990 A1 | 11/2017 | Magee et al. |
| 2017/0371227 A1 | 12/2017 | Skirlo et al. |
| 2018/0081037 A1 | 3/2018 | Medina |
| 2018/0106615 A1 | 4/2018 | Ohtomo et al. |
| 2018/0113200 A1 | 4/2018 | Steinberg et al. |
| 2018/0114388 A1 | 4/2018 | Nagler |
| 2018/0136321 A1 | 5/2018 | Verghese |
| 2018/0136540 A1 | 5/2018 | Park |
| 2018/0188359 A1 | 7/2018 | Droz |
| 2018/0189977 A1 | 7/2018 | Zecchini |
| 2018/0284286 A1 | 10/2018 | Eichenholz et al. |
| 2018/0293445 A1 | 10/2018 | Gao |
| 2018/0364334 A1 | 12/2018 | Xiang |
| 2019/0011541 A1 | 1/2019 | O'Keeffe |
| 2019/0025427 A1 | 1/2019 | O'Keeffe |
| 2019/0075281 A1* | 3/2019 | Hall ............... G01S 7/4814 |
| 2019/0121191 A1* | 4/2019 | Hegyi ............... G01J 3/2823 |
| 2019/0176844 A1 | 6/2019 | Sedlmayr |
| 2019/0219675 A1 | 7/2019 | Yoon |
| 2019/0219681 A1 | 7/2019 | Atshushi |
| 2019/0227175 A1 | 7/2019 | Steinberg |
| 2019/0271767 A1 | 9/2019 | Keilaf |
| 2019/0317217 A1 | 10/2019 | Day et al. |
| 2019/0318177 A1 | 10/2019 | Steinberg |
| 2019/0353784 A1 | 11/2019 | Toledano |
| 2020/0013181 A1 | 1/2020 | Uyeno |
| 2020/0033454 A1 | 1/2020 | Hong et al. |
| 2020/0072950 A1* | 3/2020 | Philipp ............... G01S 7/4817 |
| 2020/0099824 A1 | 3/2020 | Benemann |
| 2020/0099872 A1 | 3/2020 | Benemann |
| 2020/0116830 A1 | 4/2020 | Pacala et al. |
| 2020/0284883 A1 | 9/2020 | Ferreira |
| 2020/0353939 A1 | 11/2020 | Meng |
| 2021/0003711 A1 | 1/2021 | Vandenberg |
| 2021/0011353 A1* | 1/2021 | Yousefzadeh ......... G01S 7/4817 |
| 2021/0025997 A1* | 1/2021 | Rosenzweig ......... G01S 7/4817 |
| 2021/0041712 A1 | 2/2021 | Bilik et al. |
| 2021/0063841 A1 | 3/2021 | Yuan |
| 2021/0080575 A1 | 3/2021 | Nehmadi |
| 2021/0124367 A1 | 4/2021 | Lim |
| 2021/0129868 A1 | 5/2021 | Nehmadi |
| 2021/0190958 A1 | 6/2021 | Nonaka |
| 2021/0208263 A1 | 7/2021 | Sutavani |
| 2021/0255637 A1 | 8/2021 | Kale |
| 2021/0293931 A1 | 9/2021 | Nemet |
| 2022/0026539 A1 | 1/2022 | Bernier |
| 2022/0026540 A1 | 1/2022 | Olivier |
| 2022/0026573 A1 | 1/2022 | Baribault |
| 2022/0026576 A1 | 1/2022 | Baribault |

FOREIGN PATENT DOCUMENTS

| | | |
|---|---|---|
| CA | 3125618 C | 5/2023 |
| CN | 106462949 | 8/2019 |
| DE | 3535391 | 5/1990 |
| DE | 10361869 | 7/2005 |
| DE | 102019132239 | 6/2021 |
| EP | 2434312 A1 | 3/2012 |
| EP | 2204670 | 6/2014 |
| JP | H04172285 | 6/1992 |
| JP | 912723 | 5/1997 |
| JP | 2005170184 | 6/2005 |
| JP | 2006521536 | 9/2006 |
| JP | 2007121116 | 5/2007 |
| JP | 09178786 | 8/2009 |
| JP | 09222476 | 10/2009 |
| JP | 2010091378 | 4/2010 |
| JP | 2010529932 | 9/2010 |
| JP | 2010286307 | 12/2010 |
| JP | 11101637 | 5/2011 |
| WO | WO1991007672 | 5/1991 |
| WO | WO2000012960 | 3/2000 |
| WO | WO2005008271 | 1/2005 |
| WO | WO2008017316 | 2/2008 |
| WO | WO2008070319 | 6/2008 |
| WO | WO2011014743 | 2/2011 |
| WO | WO2011077400 | 6/2011 |
| WO | WO2018055449 | 3/2018 |
| WO | WO2018191630 | 10/2018 |
| WO | WO2019106429 | 6/2019 |
| WO | WO2019197894 | 10/2019 |
| WO | WO-2020023969 A1 * | 1/2020 ........... G01C 15/002 |
| WO | WO2022016275 A1 | 1/2022 |

OTHER PUBLICATIONS

Atiq et al., "Vehicle Detection and Shape Recognition Using Optical Sensors: A Review", 2010 Second International Conference on Machine Learning and Computing, Feb. 11, 2010 (Nov. 2, 2010).

Baig et al., "Fusion Between Laser and Stereo Vision Data For Moving Objects Tracking in Intersection Like Scenario", Fusion Between IV'2011—IEEE Intelligent Vehicles Symposium, Jun. 2011, Baden-Baden, Germany. pp. 262-367, ff10.1109/IVS.2011. 5940576ff.

Braun et al., "Nanosecond transient electroluminescence from polymer light emitting diodes", Applied Physics Letters, vol. 61(26):3092-3094 (Dec. 1992).

CA Office Action in Canadian Appln. No. 3,125,618 dated Mar. 18, 2023, 6 pages.

CA Requisition in Canadian Appln. No. 3125618, dated Oct. 15, 2021, 4 pages.

CA Requisition in Canadian Appln. No. 3125623, dated Nov. 1, 2021, 4 pages.

CA Requisition in Canadian Appln. No. 3125716, dated Oct. 18, 2021, 4 pages.

CA Requisition in Canadian Appln. No. 3125718, dated Nov. 25, 2021, 3 pages.

(56) References Cited

OTHER PUBLICATIONS

Canadian Examiners Report in CA Appln. No. 2865733, dated May 31, 2021, 3 pages.
English translation of the Notification of Reasons for Rejection issued in Japanese Patent Application No. 2018077339, dated Mar. 25, 2019, 8 pages.
EP Search Report in EP Appln. No. 16774190.9, dated Jan. 28, 2019.
Escuti, Michael J. and W. Michael Jones, "Polarization-Independent Switching With High Contrast From A Liquid Crystal Polarization Grating", Society for Information Display, 2006.
Final Office Action issued Apr. 18, 2018, in connection with U.S. Appl. No. 15/373,189, 9 pages.
Final Office Action issued by the USPTO on Mar. 23, 2023, in connection with U.S. Appl. No. 17/382,163, 17 pages.
Final rejection dated Apr. 20, 2022, issued in connection with U.S. Appl. No. 17/382,163, 20 pages.
International Preliminary Report on Patentability in International Application No. PCT/IB2013/051667, dated Sep. 2, 2014, 6 pages.
International Search Report and Written Opinion for PCT/US2016/025252, Moscow, Russia, Date of Mailing Aug. 11, 2016.
International Search Report and Written Opinion in International Application No. PCT/IB2013/051667, dated Jul. 9, 2013, 8 pages.
Kim et al., "Wide-Angle, Nonmechanical Beam Steering Using Thin Liquid Crystal Polarization Gratings", Advanced Wavefront Control: Methods, Devices and Applications VI, 2008, 7093:709302-1-12.
Non-Final Office Action in U.S. Appl. No. 17/382,163, dated Jan. 13, 2022, 31 pages.
Non-Final Office Action issued Oct. 31, 2017, in connection with U.S. Appl. No. 15/373,189, 31 pages.
Non-Final rejection dated Nov. 25, 2022, issued in connection with U.S. Appl. No. 17/382,163, 14 pages.
Notice of Allowance issued by the USPTO on Jul. 12, 2023, in connection with U.S. Appl. No. 17/382,163, 5 pages.
Notice of Allowance issued Jul. 13, 2018, in connection with U.S. Appl. No. 15/373,189 (13 pages).
Notice of Allowance issued Mar. 8, 2018, in connection with U.S. Appl. No. 14/984,704, (8 pages).
Office Action in U.S. Appl. No. 17/382,144, dated Nov. 19, 2021, 17 pages.
Office Action in U.S. Appl. No. 17/382,155, dated Dec. 24, 2021, 23 pages.
Office Action in U.S. Appl. No. 17/382,177, dated Dec. 21, 2021, 25 pages.
Office Action issued Jun. 15, 2017, in connection with U.S. Appl. No. 14/984,704, (13 pages); and.
Office Action issued Oct. 9, 2019, in connection with U.S. Appl. No. 16/011,820 (25 pages).
Office Action issued Sep. 17, 2019, in connection with U.S. Appl. No. 15/867,995 (38 pages).
PCT International Preliminary Report on Patentability in International Appln. No. PCT/IL2018/050102, dated Aug. 6, 2019, 10 pages.
PCT International Search Report and Written Opinion in International Appln. No. PCT/CA2021/051010, dated Oct. 4, 2021, 18 pages.
PCT International Search Report and Written Opinion in International Appln. No. PCT/CA2021/051011, dated Oct. 6, 2021, 15 pages.
PCT International Search Report and Written Opinion in International Appln. No. PCT/CA2021/051012, dated Nov. 2, 2021, 11 pages.
PCT International Search Report and Written Opinion in International Appln. No. PCT/CA2021/051013, dated Oct. 21, 2021, 21 pages.
PCT International Search Report and Written Opinion in International Appln. No. PCT/IL2018/50102, dated Aug. 8, 2018, 14 pages.
Petrovskaya et al., "Awareness of Road Scene Participants for Autonomous Driving", Stanford University (USA), INRIA (France), Coimbra University (Portugal), University of Frieburg (Germany), University of Oxford (UK), Ohio Northern University (USA), Oct. 12, 2011.
Supplemental Notice of Allowability issued Sep. 12, 2018, in connection with U.S. Appl. No. 15/373,189 (4 pages).
EP European Search Report issued on Jul. 18, 2024, in connection with European Patent Application No. 21846515.1, 12 pages.

* cited by examiner solid state steering engine

| Sequence of tiles | Switching commands sequence |
|---|---|
|  | Commands sequence # 1 |
|  | Commands sequence # 2 |
|  | Commands sequence # 3 |

BEAM-STEERING DEVICE PARTICULARLY FOR LIDAR SYSTEMS

CROSS-REFERENCE TO RELATED APPLICATIONS

This application is a continuation application of and claims the benefit of priority to U.S. application Ser. No. 17/382,163, filed on Jul. 21, 2021, which claims priority under 35 USC 119(e) to U.S. Patent Application Ser. No. 63/136,765, filed on Jan. 13, 2021, U.S. Patent Application Ser. No. 63/145,795, filed on Feb. 4, 2021 and U.S. Patent Application Ser. No. 63/054,634, filed on Jul. 21, 2020, the entire contents of which are hereby incorporated by reference.

FIELD OF THE INVENTION

The invention relates to a beam-steering device and a method for operation of a beam-steering device, particularly for LIDAR systems using one or more light beam-steering stages to selectively deflect a light beam.

BACKGROUND OF THE INVENTION

Beam-steering devices using one or more steering stages are described in the U.S. Pat. No. 8,982,313, the contents of which are hereby incorporated by reference. In a specific example of implementation, each steering stage includes a polarization grating with a director pattern that interacts with incoming light to deflect the light at a selected propagation angle. In the active version of the steering stage, the polarization grating includes a switchable liquid crystal layer having a periodic profile of spatially varying optical anisotropy, for example as provided by a birefringent liquid crystal material. The polarization grating is capable of diffracting incident light into three possible diffracted orders ($0^{th}$, $+1^{st}$ and $-1^{st}$) according to input polarization and applied voltage.

More specifically, the polarization grating is switchable between at least two operational modes. The switching alters the periodic profile of the grating such that the grating interacts with incoming light differently in each operational mode. Accordingly, the switching provides a level of control over the direction of propagation of the light. The switching operation is characterized by an on mode and an off mode. The on mode is achieved by applying a voltage to the grating which induces a change to the periodic profile. For instance, the voltage can alter the profile such that the grating will no longer deflect the light at some angle. Rather the light will propagate along its incoming direction. The off mode is achieved by removing the voltage which allows the periodic profile to acquire its original configuration in which it deflects the light. As such, when voltage is applied to the grating, the light deflecting effect is negated. And when no voltage is applied, the periodic pattern deflects lights at an angle. That angle can be positive or negative depending on the polarization handedness of the incoming light beam.

The polarization of the incident light introduced into the polarization grating is controlled by a polarization selector, which is also switchable. Typically, the polarization selector is placed before the polarization grating. The polarization selector may include a liquid-crystal layer operable to be switched between a first mode that does not substantially alter the polarization of the incident light and a second mode that alters the polarization state of light passing through it.

In the passive version, the polarization grating is not switchable. The polarization selector is still switchable. In this version, the polarization grating is capable of diffracting incident light in two diffracted orders ($+1^{st}$, $-1^{st}$), the order selection being made by controlling the polarization of the incident light beam with the polarization selector.

The switching operation of the polarization grating and/or of the polarization selector is not an instantaneous event. In other words, some time is required after a voltage is applied for the operational mode of the optical component to change. Similarly, when the voltage is removed a relaxation time is required for the optical component to revert back to its initial operational mode. Typically, the relaxation time is significantly longer than the switching on time. The relaxation time and the switching on time are transition periods during which the optical component does not behave as expected in terms of light transmission properties. It is therefore preferable not to rely on the optical component during those transitions for predictable light management performance.

The disadvantage of the switching on time and the relaxation time is that the beam-steering rate is limited. Moving the beam from one step to the next step requires waiting for the switching on time and/or relaxation time to pass.

It is therefore an objective of the invention to provide improved methods and systems for better management of the LIDAR apparatus using a beam-steering engine, in particular better management of the transitions times between operational modes of the beam-steering engine.

SUMMARY OF THE INVENTION

As embodied and broadly described herein, the invention provides a beam-steering engine, comprising an optical element switchable between a first operational mode and a second operational mode, in the first operational mode of the optical element the beam-steering engine is configured to output an input light beam incident on the beam-steering engine along a first propagation direction and in the second operational mode of the optical element the beam-steering engine is configured to output the input light beam incident on the beam-steering engine along a second propagation direction. A transition of the optical element between the first and second operational modes is characterized by a transition time period that varies with a temperature of the optical element. The beam-steering engine further includes a device to control a temperature of the solid-state optical element to maintain the transition time period below a certain limit.

As embodied and broadly described herein, the invention further includes a method for steering a light beam, comprising providing a steering engine comprising an optical element switchable between a first operational mode and a second operational mode, in the first operational mode of the optical element the steering engine is configured to output an input light beam incident on the steering engine along a first propagation direction, in the second operational mode of the optical element the steering engine is configured to output the input light beam along a second propagation direction, a transition of the optical element between the first and second operational modes being characterized by a transition time period that varies with a temperature of the optical element. The method further including directing an input light beam at the optical element, switching the optical element in a selected operational mode to direct the beam output by the steering engine in a selected propagation direction, and controlling a temperature of the optical element to maintain the transition time below a certain limit.

As embodied and broadly described herein the invention provides a LIDAR apparatus for scanning a scene, comprising a transmitter stage for generating a light beam, a receiver stage and a beam-steering engine configured to steer the light beam to scan at least a portion of the scene. The beam-steering engine including a first steering stage to steer the light beam by performing continuous deflection of the light beam and a second steering stage to steer the light beam steered by the first steering stage by performing stepwise deflection of the light beam steered by the first steering stage.

As embodied and broadly described herein, the invention further includes a method for scanning a scene, comprising providing a LIDAR apparatus including a transmitter stage for generating a light beam, a receiver stage, a beam-steering engine configured to steer the light beam to scan at least a portion of the scene, the beam-steering engine including a first steering stage to steer the light beam by performing continuous deflection of the light beam and a second steering stage downstream the first steering stage to steer the light beam steered by the first steering stage by performing stepwise deflection of the light beam. The method including deflecting the light beam by the first steering stage with a continuous motion and deflecting the light beam stepwise by the second steering stage to scan the scene and sensing an optical return with the receiver stage and generating an output conveying a representation of the scene.

As embodied and broadly described herein, the invention further provides a LIDAR apparatus for scanning a scene, comprising a transmitter stage for generating a light beam, a receiver stage, a beam-steering engine configured to steer the light beam received from the transmitter stage to scan at least a portion of the scene, the beam-steering engine including an optical component, the beam-steering engine being responsive to steering commands to steer the light beam in a steering range by performing an angular deflection of the light beam in discrete steps within the steering range. The LIDAR apparatus further includes a controller comprising a data processor for receiving at an input data describing a sub-portion of the scene to be scanned by the LIDAR apparatus and deriving from the input data steering commands configured to operate the steering engine such that the light beam is directed at the sub-portion of the scene.

As embodied and broadly described herein the invention further includes a method for scanning a scene, comprising generating a light beam, providing a beam-steering engine configured to steer the light beam to scan at least a portion of the scene, the beam-steering engine including an optical component, the beam-steering engine being responsive to steering commands to steer the light beam in a steering range by performing an angular deflection of the light beam in discrete steps within the steering range, receiving data describing a sub-portion of the scene to be scanned by the light beam, and processing the data with a data processing device to generate steering commands configured to operate the steering engine such that the light beam is directed at the sub-portion of the scene.

As embodied and broadly described herein, the invention further provides a LIDAR apparatus for scanning a scene, comprising a transmitter stage, a receiver stage, a beam-steering engine configured to steer the light beam received from the transmitter stage in different directions to scan at least a portion of the scene, the beam-steering engine being responsive to steering commands to produce corresponding deflections of the light beam and an operation monitor for monitoring a beam-steering function of the beam-steering engine.

As embodied and broadly described herein the invention further provides a method for scanning a scene, comprising providing a LIDAR apparatus having a transmitter stage, a receiver stage and a beam-steering engine configured to steer the light beam received from the transmitter stage in different directions to scan at least a portion of the scene, the beam-steering engine being responsive to steering commands to produce corresponding deflections of the light beam. The method includes receiving a sensor signal conveying an operational parameter of the beam-steering engine and detecting at least in part from the sensor signal a fault in the beam-steering function of the beam-steering engine.

As embodied and broadly described herein the invention further provides a method for scanning a scene, comprising providing a LIDAR apparatus having a transmitter stage, a receiver stage and a beam-steering engine configured to steer the light beam received from the transmitter stage in different directions to scan at least a portion of the scene, the beam-steering engine being responsive to steering commands to produce corresponding deflections of the light beam. The method further includes receiving data at an input of a data processor, wherein the data describes the scene, and it is derived at least in part from the LIDAR apparatus and processing the data to detect a fault in the beam-steering function of the beam-steering engine.

As embodied and broadly described herein the invention further provides a light beam-steering engine, comprising an optical element switchable between a first operational mode and a second operational mode wherein in the first operational mode the beam-steering engine is configured to output an input light beam passing through the beam-steering engine, along a first propagation direction and in the second operational mode of the optical element the beam-steering engine is configured to output the input light beam along a second propagation direction. A transition of the optical element between the first and second operational modes is characterized by a transition time period. The beam-steering engine further comprising a timer to measure the transition time period as the element switches between operational modes.

As embodied and broadly described herein the invention further provides a LIDAR apparatus for scanning a scene, comprising a transmitter stage for generating a light beam, a receiver stage and a beam-steering engine configured to steer the light beam received from the transmitter stage to scan at least a portion of the scene, the beam-steering engine including an optical component, the beam-steering engine being responsive to steering commands to steer the light beam by performing an angular deflection of the light beam in discrete steps within a steering range, the optical component being switchable between operational modes corresponding to different light propagation directions by the beam-steering engine. The LIDAR apparatus further includes a controller for generating the steering commands, the controller being responsive to a control signal to adapt the steering commands by altering a timing between successive switching commands commanding the optical component to switch from one operational mode to the other.

As embodied and broadly described herein the invention further provides a light beam-steering engine, comprising an optical element switchable between a first operational mode and a second operational mode, in the first operational mode of the optical element the beam-steering engine is configured to output an input light beam passing through the beam-steering engine along a first propagation direction, in the second operational mode of the optical element the beam-steering engine is configured to output the input light beam along a second propagation direction, the beam-steering engine being characterized by a contrast ratio that varies with a temperature of the beam-steering engine. The light beam-steering engine including a device to control a temperature of the beam-steering engine to maintain the contrast ratio above a certain limit.

DESCRIPTION OF AN EXAMPLE OF IMPLEMENTATION

Figure 1:
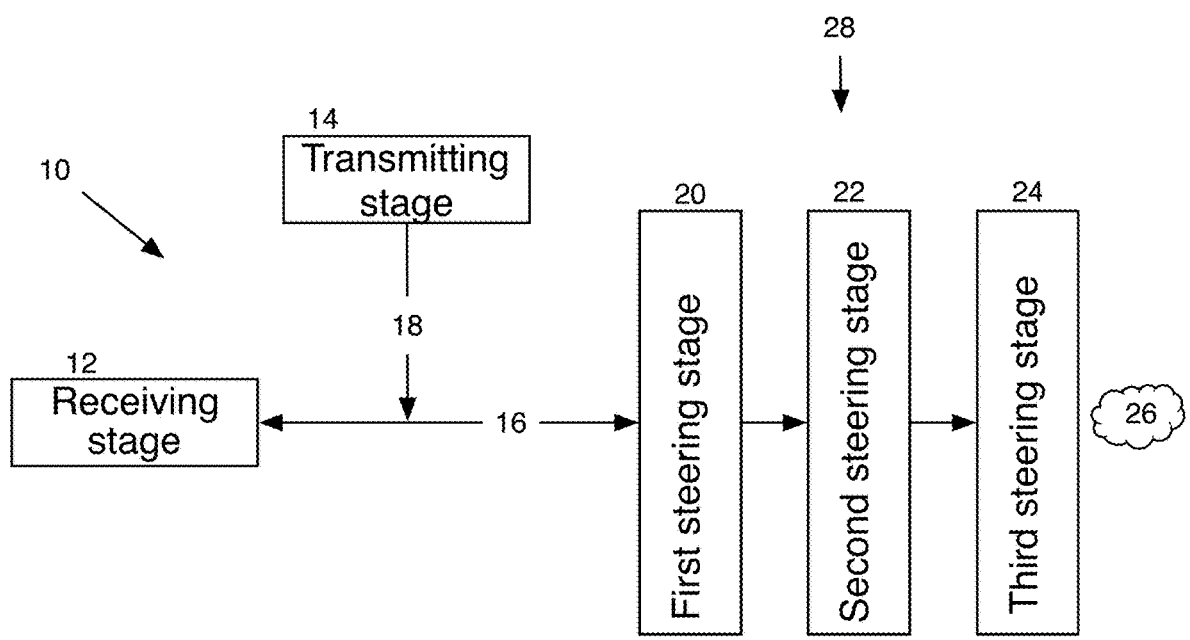
FIG. 1 is a block diagram illustrating components of a LIDAR apparatus using beam-steering.

With reference to FIG. 1, a LIDAR apparatus 10 is shown which creates a point cloud depicting the scene 26. The LIDAR apparatus includes a transmitting stage 14, which includes a light source to illuminate the scene 26. Objects in the scene 26 will reflect or back scatter the projected light. The light returns are sensed by the receiving stage 12, where they are converted into electrical signals. The light returns convey distance information from objects in the scene 26 which can be measured on the basis of Time Of Flight (TOF) and Frequency-Modulated Continuous-Wave (FMCW), among others. A controller shown in FIG. 10 converts the electrical signals into a point cloud which is a set of data points in space that represent a 3D shape of the scene. Typically, but not always, each data point has a set of X, Y and Z coordinates.

The LIDAR apparatus 10 has a beam-steering engine 28, including multiple beam-steering stages. The LIDAR apparatus can be placed either at the back or front of a host vehicle to create a representation of the environment in which the vehicle travels. In the example shown, the beam-steering engine has three beam-steering stages 20, 22 and 24, respectively. Each beam-steering stage is designed to deflect the light beam by a certain angle. The angular deflections produced at each stage add up (or subtract) to produce an outgoing beam that is directed at the scene 26. By altering the deflection angles at the beam-steering stages 20, 22 and 24 it is possible to displace the outgoing beam in a scanning motion and thus scan the scene.

Generally speaking, multiple beam-steering stages are useful because they can increase the overall angular beam deflection range at the output of the LIDAR apparatus and also increase the number of discrete angular steps within that overall range for an increased scanning resolution. In this example, three steering stages are being used, but it should be understood that more than three or less than three steering stages can be used. A steering engine consisting of a single steering stage can be used.

The beam-steering stages can operate on the basis the same or different beam-steering technologies. For example, the first beam-steering stage 20 includes a moveable optical element. The optical element is designed to reflect or diffract the incoming beam and by changing the position or orientation of the optical element the properties of the outgoing beam change, such as the angle of the propagation of the beam. In a specific example, the optical element can be a Micro-ElectroMechanical System (MEMS) using a moveable mirror to deflect the incoming beam and produce a scanning pattern of light. The MEMs mirror is controlled by a scanning mechanism that imparts to the mirror a cyclical movement producing a repeating scan of the outgoing beam. The scan can walk the beam in the horizontal direction, the vertical direction or have a hybrid pattern, such as for example a raster pattern. Typically, the movement of a MEMS mirror is a continuous movement over a predetermined angular steering range such as to produce a continuous displacement of the beam into the scene. By continuous displacement is meant a displacement where the mirror has either an infinite number of steps within the steering range or a finite number of micro steps, but the number of micro steps largely exceeds the discrete angular steering steps of the other steering stages. For example, the mirror may be configured to move in micro steps where each produces an angular deflection of less than 0.1 degree. In contrast, angular discrete steering steps, which is the mode of operation of the second and the third steering stages, are steps where the angular deflection from one step to the other is much larger, in the order of 2 degrees, 4 degrees, 5 degrees, 6 degrees or more per step.

The second beam-steering stage 22 is a solid-state beam-steering stage using optical elements to selectively impart to the light beam a propagation direction that defines a non-zero angle with relation to the direction of incidence of the incoming beam. In a specific example of implementation, the second stage uses a static grating with a director pattern that interacts with the incoming light to diffract the light in a direction of propagation that is determined by the director pattern properties. Optionally, in the so called, "active" configuration, the polarization grating is such that the director pattern can be selectively turned "on" or "off". In the operational "on" state, the director pattern re-directs the light in a propagation direction at the desired angle.

In the "off" state the director pattern acts as a pass-through optical element and does not re-direct the light beam.

The sign of the light deflection angle when the director pattern is in the "on" state can be controlled by the handedness of the circular polarization of the incoming light beam. For instance, when the incoming beam has a right-hand circular polarization the director pattern deflects the light beam in one direction, while if the incoming beam has a left-hand circular polarization the director pattern deflects the light beam in the opposite direction. Accordingly, the outgoing beam can propagate along one of three possible directions: (1) a positive deflection angle; (2) no deflection and (3) a negative deflection angle.

In a variant, in the passive configuration, the polarization grating is not switchable. In this configuration the polarization grating produces either a positive deflection angle or a negative deflection angle.

Thus, the solid-state second beam-steering stage 22 is a beam-steering device that can move the beam in discrete steps throughout the scan range. It is therefore advantageous to use in the beam-steering engine 28 a steering stage that provides a continuous beam motion to provide a continuous motion of the beam projected from the LIDAR apparatus or at the least reduce the angular spacing between the beam steps.

Figure 9:
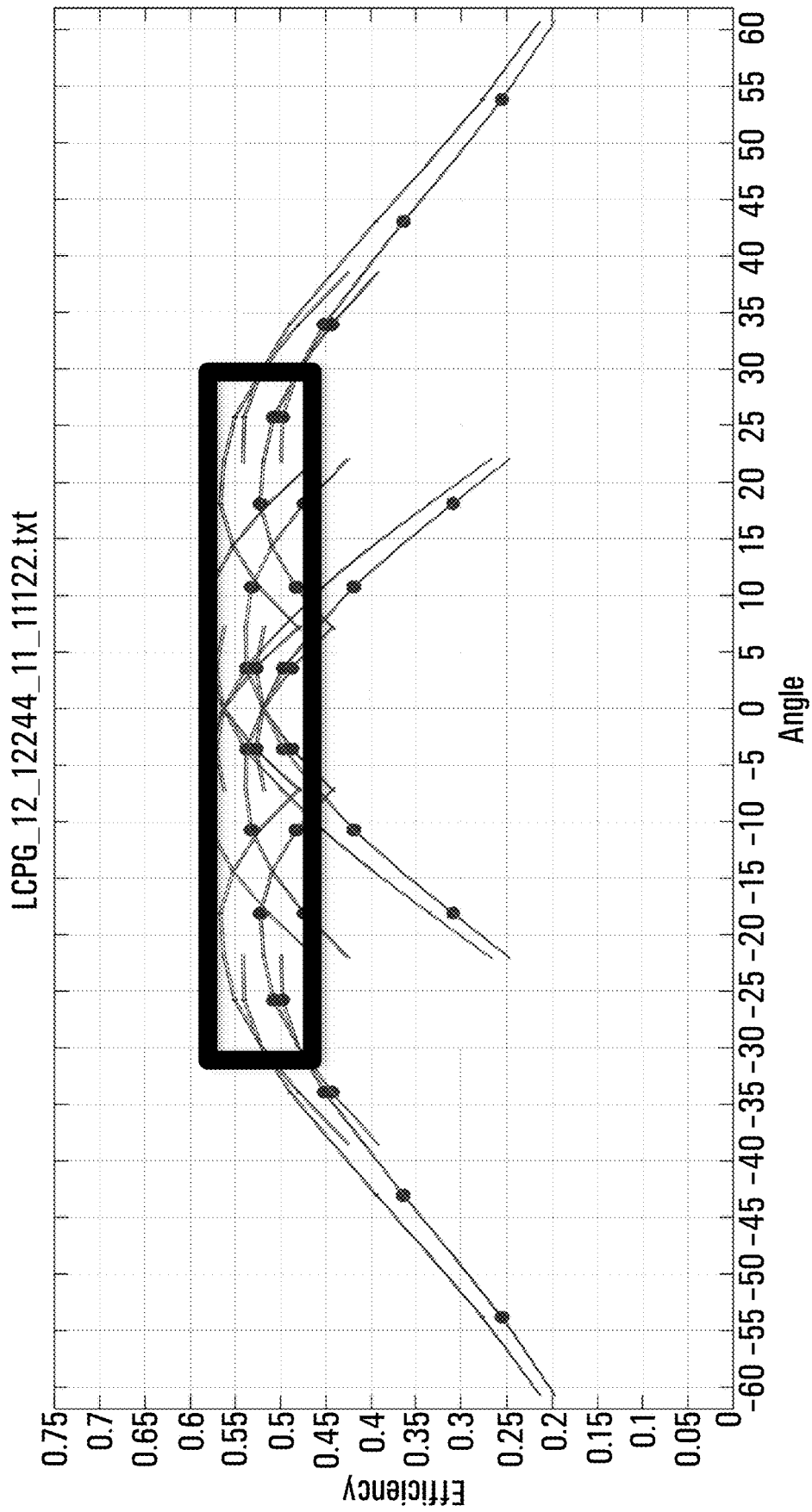
FIG. 9 is a graph illustrating the efficiency of a steering engine of the LIDAR apparatus shown in FIG. 1.

The third steering stage 24 can be identical to the second steering stage 22 and can be used to amplify the deflection angle of the beam and or add more discrete steps. In practice, a grating with a director pattern operates in a relatively high efficiency range if the light deflection is kept below a certain angular deflection. Above this angular deflection the efficiency drops. For that reason, it may be preferable to stack up several gratings, each deflecting the light by a certain angle that is within the high efficiency range, where the individual deflection angles add-up to a larger deflection angle. With specific reference to the graph shown in FIG. 9, it will be noted that angular deflections that are less than about plus or minus 8 degrees maintain a high degree of efficiency, however the efficiency drops with higher angles.

With specific reference now to FIG. 2 the transmitting and the receiving stages 12 and 14 will be described in greater detail. The transmitting stage 14 has a laser source 30 that can operate in the 900 nm range or alternatively in the 1500 nm range. The outgoing laser beam is focused by collimating optics 32 toward an optical path that is shared by the transmitting stage 14 and the receiving stage 12, including a beam splitter 38 which separates the outgoing beam from the optical returns. In the case of the incoming beam received from the collimating optics 32, the laser light is highly polarized such that most of the energy is reflected by the beam splitter, which can be a polarization beam splitter toward the beam-steering engine 28 over the optical path 16. As to reflected or back-scattered light collected from the scene 26 and which is transmitted through the steering engine 28, the light is transmitted back over the optical path toward the beam splitter 38. However, since this light has lost a significant degree of polarization, the bulk of the energy is transmitted through the beam splitter 38 toward the receiving stage 12.

This shared optical path configuration has advantages in terms of simplicity and compactness, at the expense of some optical losses.

The returning optical light from the beam splitter 38 is received by an objective 36 which focuses the light on the sensitive surface of an optical receiver 34. The receiver 34 may be one using Avalanche Photo Diodes (APDs). While not shown in the drawings the electrical output of the receiver 34 is directed at the controller 68 shown in FIG. 10 that generates the point cloud. The controller 68 also controls the operation of the transmitting stage 14 and the operation of the steering engine 28 such as to synchronize all these components.

Figure 2:
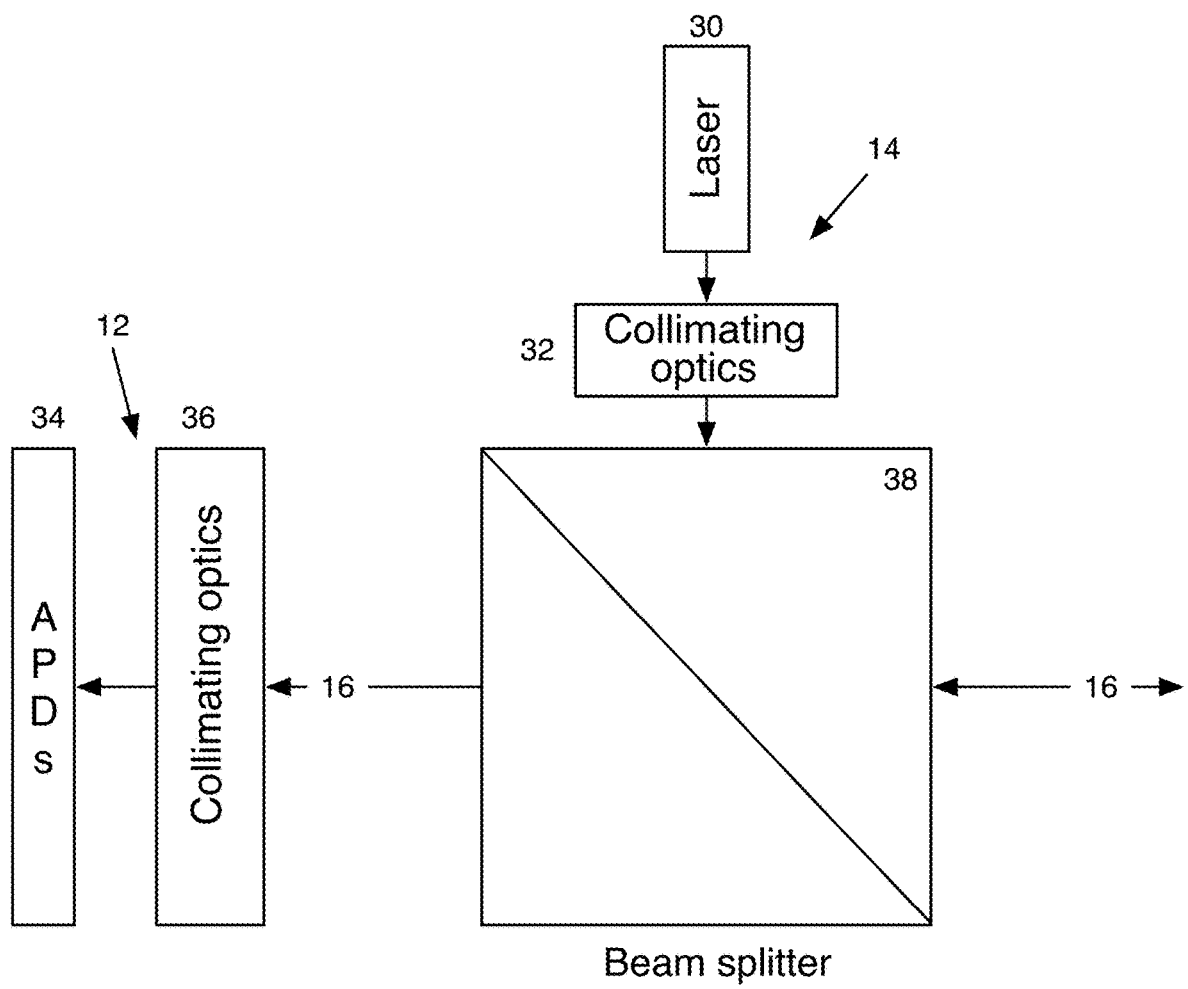
FIG. 2 is a more detailed block diagram of the receiving and transmitting stages of the LIDAR apparatus shown in FIG. 1.
Figure 3:
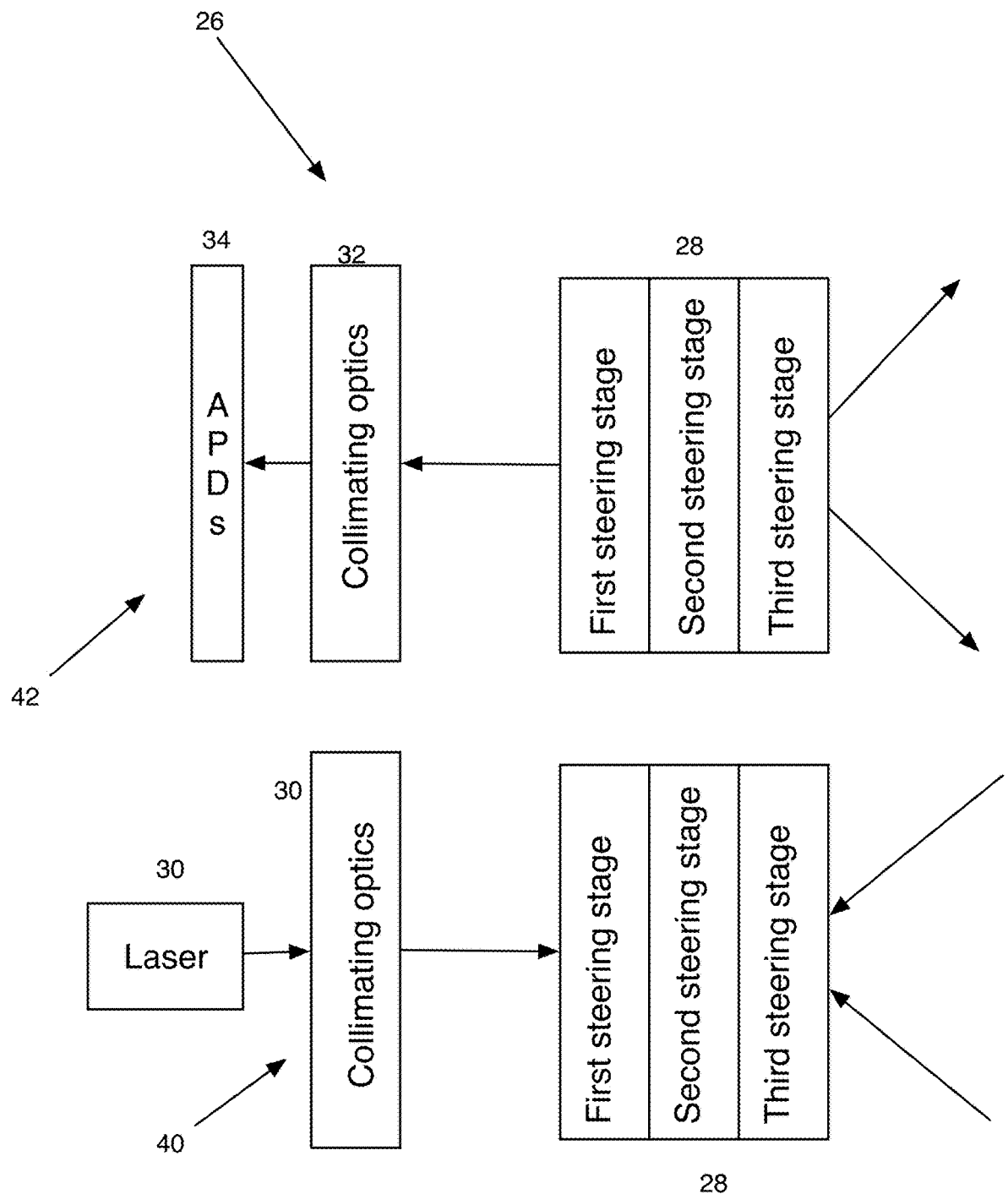
FIG. 3 is an arrangement which is a variant of the arrangement shown in FIG. 2.

FIG. 3 illustrates a variant of the architecture shown in FIG. 2, in which the transmitting and the receiving optical paths are separated and independent from each other. In this example, the LIDAR apparatus 10 has a transmitter 26 with a transmitting stage using a dedicated steering engine 28 and a receiver 42 using its own steering engine 28. Physically, both the receiver 42 and the transmitter 26 are placed in a housing side by side, either vertically or horizontally. It is to be noted that the transmitting steering engine and the receiving steering engine are controlled independently from each other. While in most situations their operations would be synchronized it is possible, they are not always synchronized.

Figure 4:
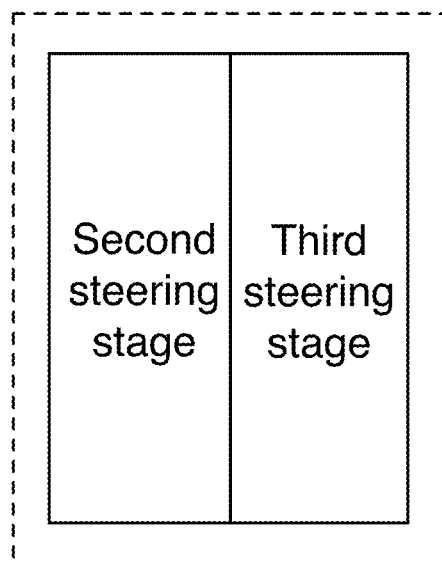
FIG. 4 is a more detailed block diagram of a solid-state steering engine which can be used in the LIDAR apparatus shown in FIG. 1.

With reference to FIG. 4, a block diagram of a preferred embodiment of the second and the third steering stages is shown, forming a solid-state steering engine 44. The solid-state steering engine 44 has no moving parts and includes a stack of plate-like optical elements. It will be understood that the solid-state steering engine 44 can be coupled with a separate first steering stage, such as the steering stage 20 using MEMS optical elements.

Figure 5A:
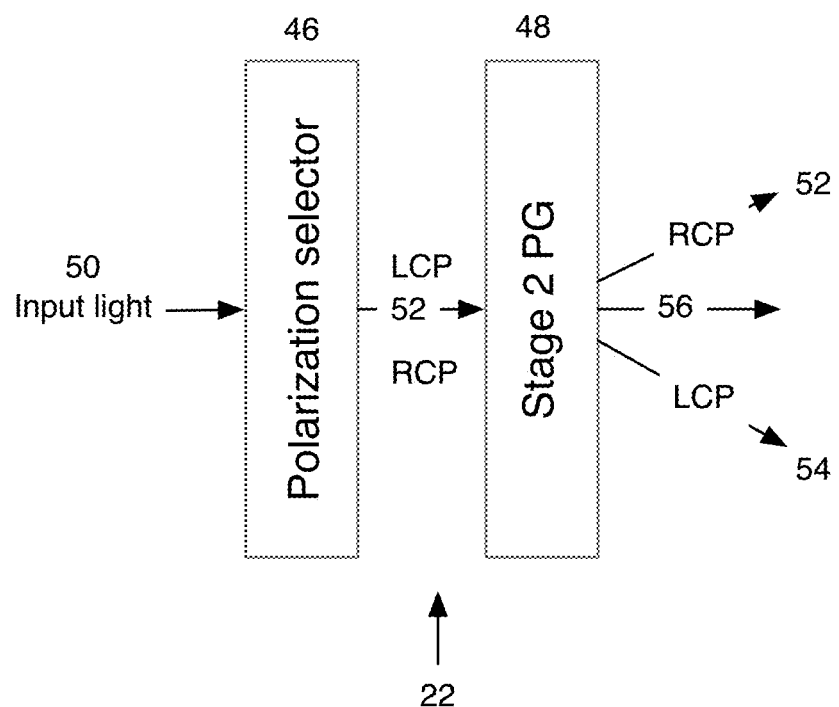
FIG. 5a is a block diagram illustrating a range of light propagation pathways of the second steering stage of the solid-state steering engine shown in FIG. 4, using a polarization grating in the active configuration.
Figure 5B:
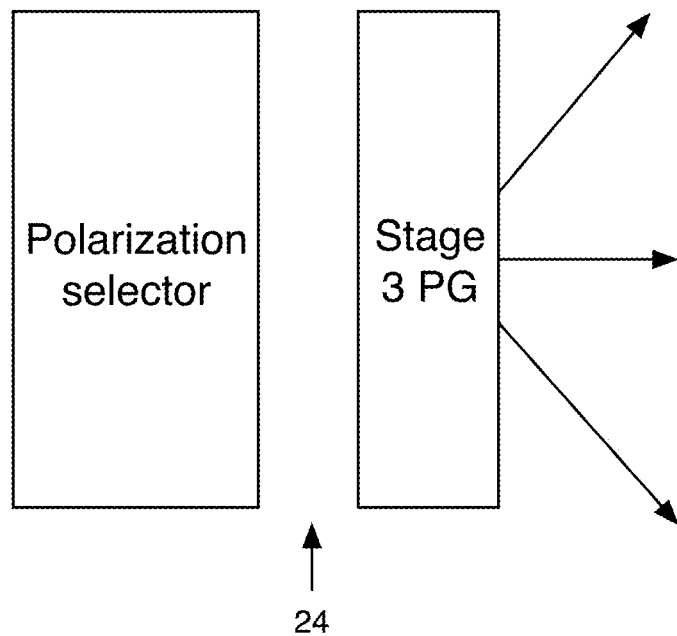
FIG. 5b is a block diagram showing the light propagation pathways of the third steering stage of the solid-state steering engine shown in FIG. 4.

With specific reference to FIG. 5a, the structure of the second steering stage 22 using an active polarization grating will be described. The second steering stage 22 has a plate-like polarization selector 46 stacked on a Polarization Grating (PG) 48, which is preferably is a Liquid Chrystal Polarization Grating (LCPG). The polarization selector is preferably switchable between a first mode that does not change the polarization of the incident light beam and a second mode that reverses the polarization of the light beam. In a specific example, the polarization selector includes a waveplate. For details about the construction of the polarization selector and the LCPG the reader is invited to refer to the description in the U.S. Pat. No. 8,982,313 the contents of which are hereby incorporated by reference.

As discussed later the beam-steering stage 22 is responsive to steering commands, which are electrical signals that set the operational modes of the polarization selector 46 and the PG 48 (to the extent those modes are changeable) to obtain the desired beam deflection such as the output beam projected toward the scene is directed at the desired location of the scene. By changing the steering commands and thus altering the operational modes of the optical components of the beam-steering engine 22, the light beam can be progressively displaced and walked over the scene to produce a scan in the selected pattern.

More specifically, input light 50 is received by the polarization selector that is configured to control the polarization state of the light beam. The input light has a circular polarization. If the laser 30 does not input directly circularly polarized light, which is likely to be the case of most implementations, additional optical elements will be required to impart to the light beam a circular polarization. Thus, the circularly polarized light that is input has either Left-hand Circular Polarization (LCP) or Right-hand Circular Polarization (RCP). The purpose of the polarization selector 46 is to alter the polarization of the light passing through the selector. More specifically, the polarization selector is a switchable liquid crystal layer that can be switched between two operational modes, in the first operational mode the polarization selector does not affect the polarization state of the light input while in the second operational mode the polarization selector alters the polarization state, such as for example reversing the handedness. Accordingly, assuming the input light is LCP polarized, in the first operational mode that does not affect the polarization state the output light will still be LCP polarized. However, if polarization selector is switched in the second operational mode, the LCP polarized input light will be RCP polarized at the output.

The polarization selector 46 is switched between the first operational mode and the second operational mode by applying a voltage to the polarization selector.

The PG 48 that receives the polarized light according to the selected handedness is configured to re-direct the light to an angle in relation to the incident light direction. The PG 48 has a director pattern that diffracts the polarized light into one of two directions, either a positive angle or a negative angle, depending on the polarization handedness. The PG 48 is also switchable between two operational modes. In the first operational mode the director pattern is intact such as to be able to perform the light diffraction. In the second operational mode the director pattern is distorted and acquires a structure where it can no longer diffract light, such that the light is not deflected, rather it exits along the same direction as the incident light.

In a first example, consider the situation where the input light 50 is LCP light. The polarization selector 46 is in an operational mode where the light it outputs is LCP light; in other words, the handedness of the original polarization is maintained. The LCP outgoing light enters the PG 48 that is an operational mode where the director pattern is intact, hence it diffracts the incoming light. Assume that the director pattern is configured such that the diffraction produces a positive deflection angle when the incoming light is LCP light. Accordingly, the light output by the PG 48 will follow the direction 52. Note that the in addition to re-directing the light, the PG 48 changes the handedness of the polarization accordingly the light output at 52 is now RCP light.

In a second example, assume that the polarization selector 46 is now switched to a different operational mode where the handedness of the light is altered. This means that the light input into the PG 48 is RCP light. The director pattern will now diffract the light according to a negative deflection angle, as per direction 54. Also, the handedness of the polarization will be flipped such that the outgoing light will be LCP light.

In a third example, assume now that the PG 48 is switched such that it acquires the second operational mode by applying a voltage to it in order to re-arrange the director pattern in a different structure where the director pattern no longer diffracts the incoming light. In that example, the PG 48 basically becomes a pass-through optical structure that does not change the direction of propagation of the light. In that operational mode, the PG 48 no longer alters the handedness of the polarization. For instance, LCP light that enters the PG 48 will be released as LCP light and RCP light will be released as RCP light along the direction 56.

Figure 5C:
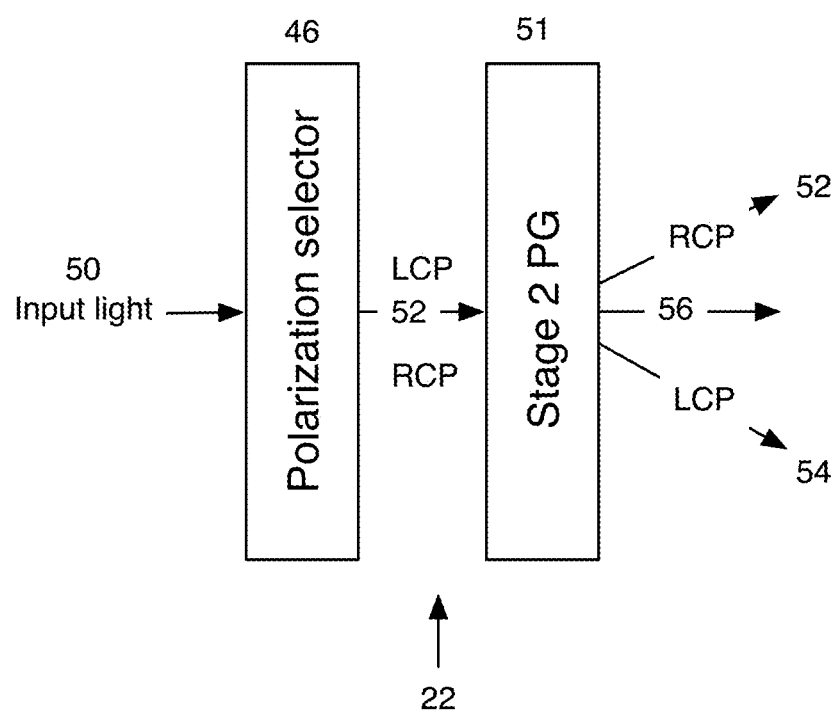
FIG. 5c is a block diagram illustrating a range of light propagation pathways of a variant of the second steering stage, using a polarization grating having a passive configuration.

In a variant, the PG is passive and it is not be switchable. This variant is shown in FIG. 5c. That is to say no signal is applied to it. In this form of construction, the director pattern which diffracts the incoming light beam is static. As a result, the PG 51 provides two angular deflection steps, one being a deflection with a positive deflection angle and the other a deflection with a negative deflection angle. Accordingly, the steering range provided by the PG 51 is defined by two light deflection directions that are angularly spaced apart from each other by an angle corresponding to the entire angular steering range. When the incident light beam has an LCP polarization the PG 51 deflects the light beam in one of the deflection directions and when the incident light beam has an RCP polarization the PG 51 deflects the light beam in the other deflection direction.

More specifically, FIG. 5c shows the light propagation directions achievable with the PG 51. Essentially, the light propagation directions are the same as those described in connection with FIG. 5a, the difference being that the light propagation direction 56 is missing and only two directions are possible; 52 and 54. In contrast the switchable (active) PG 48 provides an additional propagation direction in which the light beam is not deflected. In this case, the steering range is defined by two discrete steps, the advantage being there is increased light beam-steering granularity relative to the passive example above.

The third steering stage 24 is identical to the second steering stage 22 and multiplies the number of discrete directions along which the light projected from the LIDAR apparatus 10, including increasing the angular deflection range since the light input into the second stage 24 is already deflected by the first stage. Additional solid-state steering stages will increase the selectable steps and the overall angular beam-steering range. Note, the third steering stage 24 can use an active PG or a passive PG.

Note that the above description was made in the context of beam-steering in the horizontal plane, but it can also be made in the vertical plane. To achieve steering in both horizontal and vertical directions additional steering stages can be provided to manage the vertical beam-steering.

The switching from one operational mode to another of the PG 48 or the polarization selector 46 is not an instantaneous event. When voltage is applied to the liquid crystal material the re-arranging of the director pattern in a new structure that does not diffract light is characterized by a switching on time. The director pattern will remain in that state as long as the voltage is maintained. When the voltage is removed, the director pattern will naturally return to its original configuration in which it diffracts light. This process is characterized by a relaxation time. The relaxation time is significantly longer than the switching on time. In a specific example of implementation, the switching on time is in the range of 100 microseconds to 25 microseconds. The relaxation time can vary in the range of 1.8 milliseconds to less than 600 microseconds.

Figure 8:
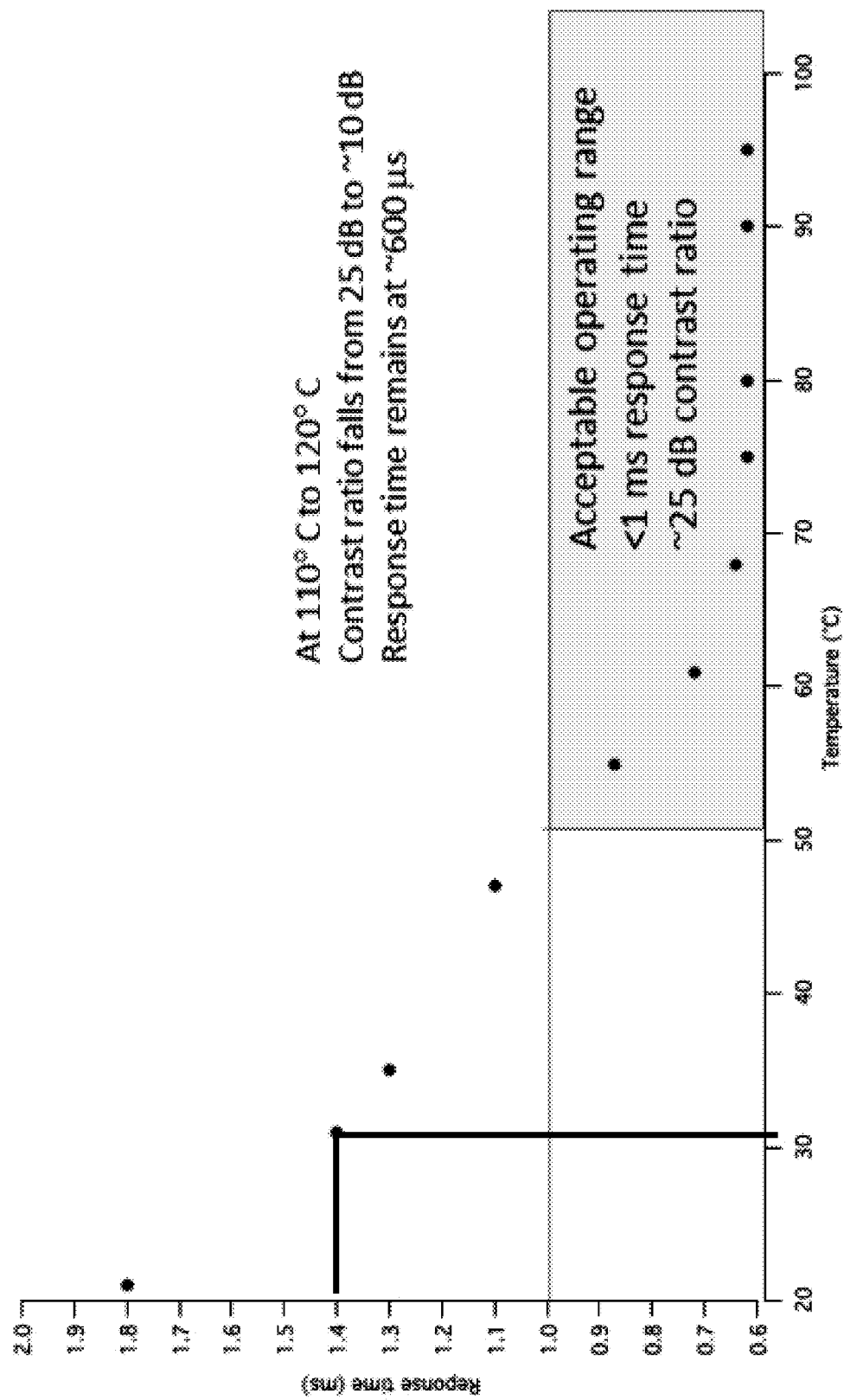
FIG. 8 is a graph illustrating the relaxation time of the polarization grating of the second or the third steering stages of the LIDAR apparatus with relation to temperature.

The relaxation time is temperature dependent. The graph in FIG. 8 shows that as the temperature of the PG 48 drops, the relaxation time increases. This is undesirable as an increase of the relaxation time would reduce the speed at which the beam can be switched, for example a switch from direction 56 to 52 or from 56 to 54. That, in turn, would affect the scanning speed of the LIDAR apparatus 10, which is the time necessary for the LIDAR apparatus 10 to scan the scene. Ultimately, the scanning speed affects the frame rate, which is the rate at which data frames of the point cloud are generated.

Several approaches can be considered to manage the transition times of the polarization selector (PS) 46 and/or the polarization grating 48, namely the switching on times and particularly the relaxation times and their effect on the overall performance of the LIDAR apparatus 10.

A first solution is to manage the temperature of the steering stages such that they remain in a temperature range where the transition times remain comparatively low. In a specific example, the shaded box in the graph of FIG. 8, identifies an operational range where the transition times, in particular the relaxation time is less than 1 millisecond. For the particular PG 48, PS 46 used, this translates in a temperature threshold that is above 52 degrees Celsius, preferably above 75 degrees Celsius, it being understood that different PG or PS constructions can have different temperature thresholds and ranges associated with them.

Figure 6:
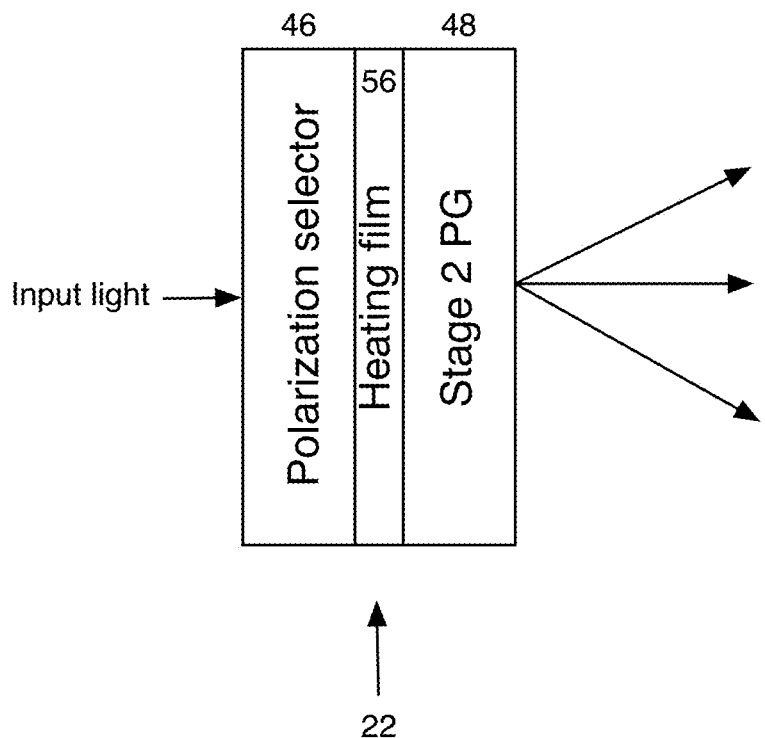
FIG. 6 is a block diagram showing the second steering stage of FIG. 5a provided with a heating element to manage the operational temperature of the second steering stage.

FIG. 6 illustrates an example of implementation where the steering stage 22 (the same would also be true for the steering stage 24) is provided with a heating element to manage the operational temperature of the steering stage. The heating element is in the form of a transparent or substantially transparent film 56 that is electrically conductive and has a sufficient resistance to be able to produce the thermal energy necessary to maintain the steering stage 22 at a temperature that is above 52 degrees Celsius and preferably substantially above that threshold. The film 56 can be made of Indium Tin Oxide (ITO). The specific composition of the ITO film 56 is selected to provide the desired light transmission properties and desired electrical conductivity in order to be able to heat the steering engine 22 at the desired temperature. It is preferred to use a film 56 that has elevated heat generation capacity to bring the steering engine up to the desired temperature relatively fast. This is useful at start-up, especially in cold climates where the temperature of the steering stage 22 may be at the sub-zero level and it is desirable to heat up quickly the steering stage 22 such as to be able to achieve a minimal operational data frame rate of the point cloud.

Electrodes, not shown in the drawings are provided at the edges exposed edges of the film 56 to create the current flow into the film.

Figure 7:
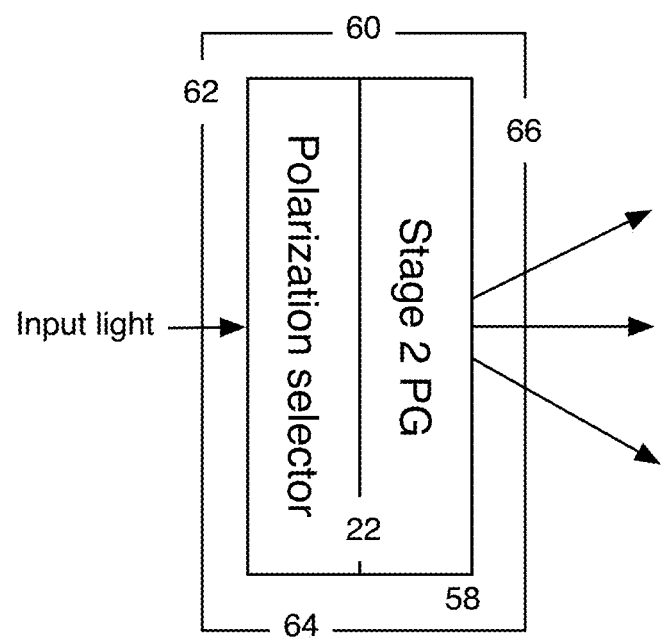
FIG. 7 is a block diagram of the second steering stage mounted in a heated enclosure to manage the operational temperature of the second steering stage.

In a possible variant shown in FIG. 7, the steering engine 22 is placed in an enclosure 58 which is thermally controlled. The enclosure has sides and defines a chamber in which a substantially higher temperature can be maintained than the ambient temperature. In the example shown in the drawings the enclosure has walls 60, 62, 64 and 66. The wall 66 is a transparent window to allow the light to pass through such that the LIDAR apparatus 10 can scan the scene and receive reflected or backscattered light from the scene. If the light transmitting stage and the light receiving stage reside outside the enclosure 60, the wall 62 will also be transparent. The temperature control in the enclosure can be achieved by a heating element placed at any suitable location in the enclosure 58. For instance, the transparent window can be heated to control the temperature of the enclosure and dissipate any fog or condensation that may form on the external surface of the window in applications where the external surface is exposed to elements that can induce formation of such fog or condensation.

Another approach to manage the transition times, which can be used in addition to the temperature control is the synchronization between the switching of multiple steering stages. If transition times are necessary, it would be desirable for such transition times to occur concurrently between stages instead of sequentially. In this fashion, the overall transition time, which is the time for all the stages to transition to the desired operational state would be reduced.

Figure 10:
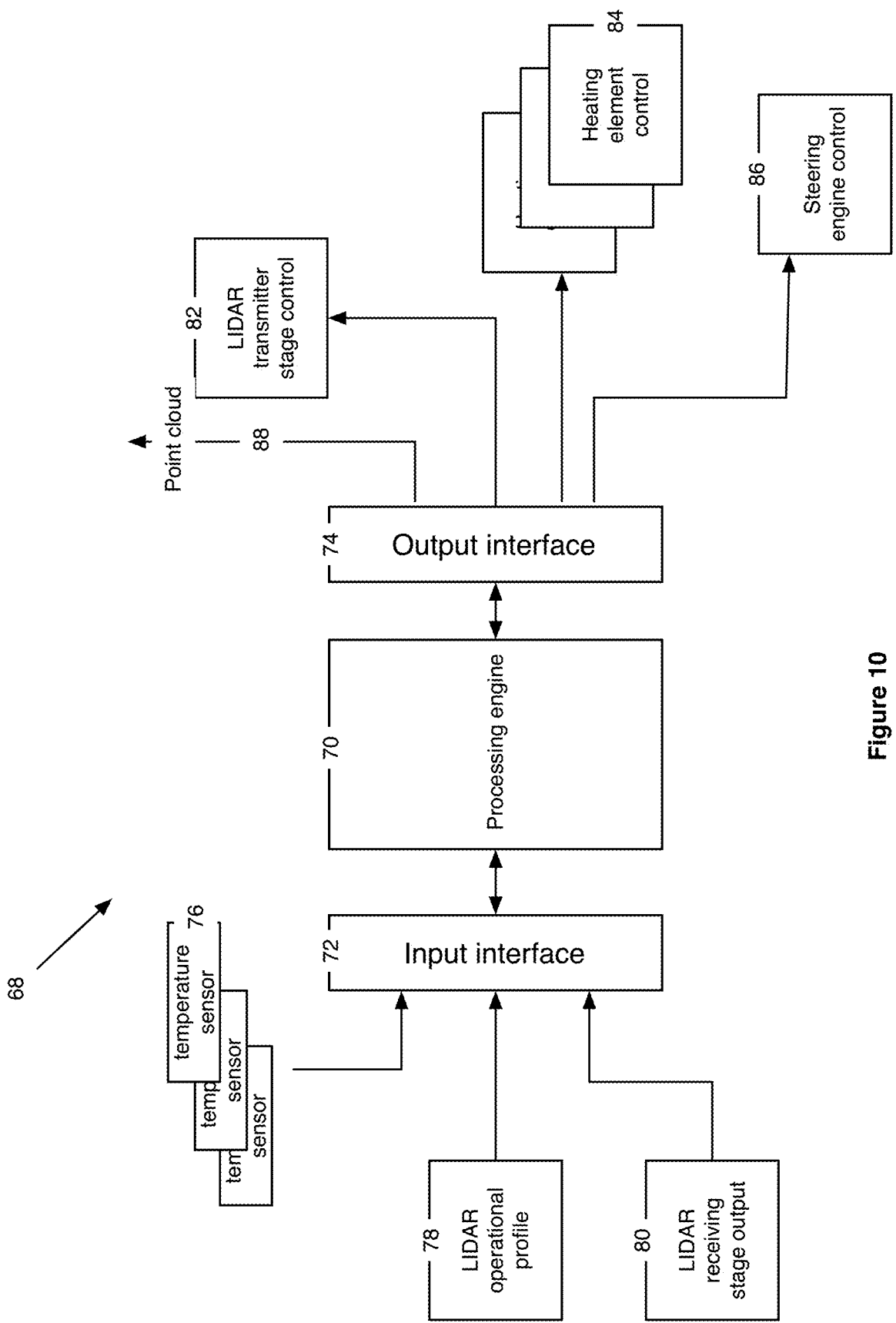
FIG. 10 is a block diagram of a controller of the LIDAR apparatus shown in FIG. 1.

The control of the LIDAR apparatus 10 in general and the switching of the various steering stages in particular is controlled by a controller 68. A block diagram of the controller is shown in FIG. 10. The controller has a processing engine 70 which includes one or more CPUs executing software in the form of machine instructions encoded on a non-transitory machine-readable medium. The instructions define the overall functionality of the processing engine 70.

The controller 68 has an input interface that receives inputs from external entities. These inputs are in the form of signals which the processing engine processes and generates outputs via the output interface 74. The outputs would typically be control signals to drive components of the LIDAR apparatus 10. Also, the output interface 74 outputs the point cloud sensed by the LIDAR apparatus 10 and which is the 3D representation of the scene.

The temperature sensor 76 provides information about the temperature of the steering engine. The temperature sensor can be placed at any suitable location on the steering engine such as to sense the temperature. As the block diagram at FIG. 10 shows, there are multiple temperature sensors 76, one per steering stage. If the LIDAR apparatus 10 has the capability to control the temperature of multiple heating elements, one per steering stage for example, the independent temperature sensing per steering stage allows to tailor the temperature to each stage independently. This may be useful in instances where the steering stages are not identical, and each may have different operational temperature thresholds.

The lidar operational profile 78 is a configuration setting that conveys a number of parameters of the LIDAR apparatus 10 that can be varied to tailor the operation of the LIDAR apparatus 10 to a range of different operational conditions. For example, the LIDAR apparatus can be adjusted such as to focus the sensing in one area of the scene at the expense of other areas of the scene. This would be the case in instances where objects of interest are identified in some portion of the scene and it would be desirable to focus the LIDAR apparatus in that area to get more resolution on the objects of interest. The LIDAR apparatus can also be configured to such as to increase the amplitude of the optical scanning beam for a longer-range scanning where objects of interest reside at a longer distance from the LIDAR apparatus 10. Conversely, the intensity of the light beam may be reduced in instances where objects of interest, in particular objects that have strong reflections, such as road signs, are close. In that situation an optical beam of strong intensity would produce optical returns that are of high intensity also, making it more difficult for the sensitive surface 34 to handle. In fact, it is possible that such strong returns saturate the APDs.

Figure 11:
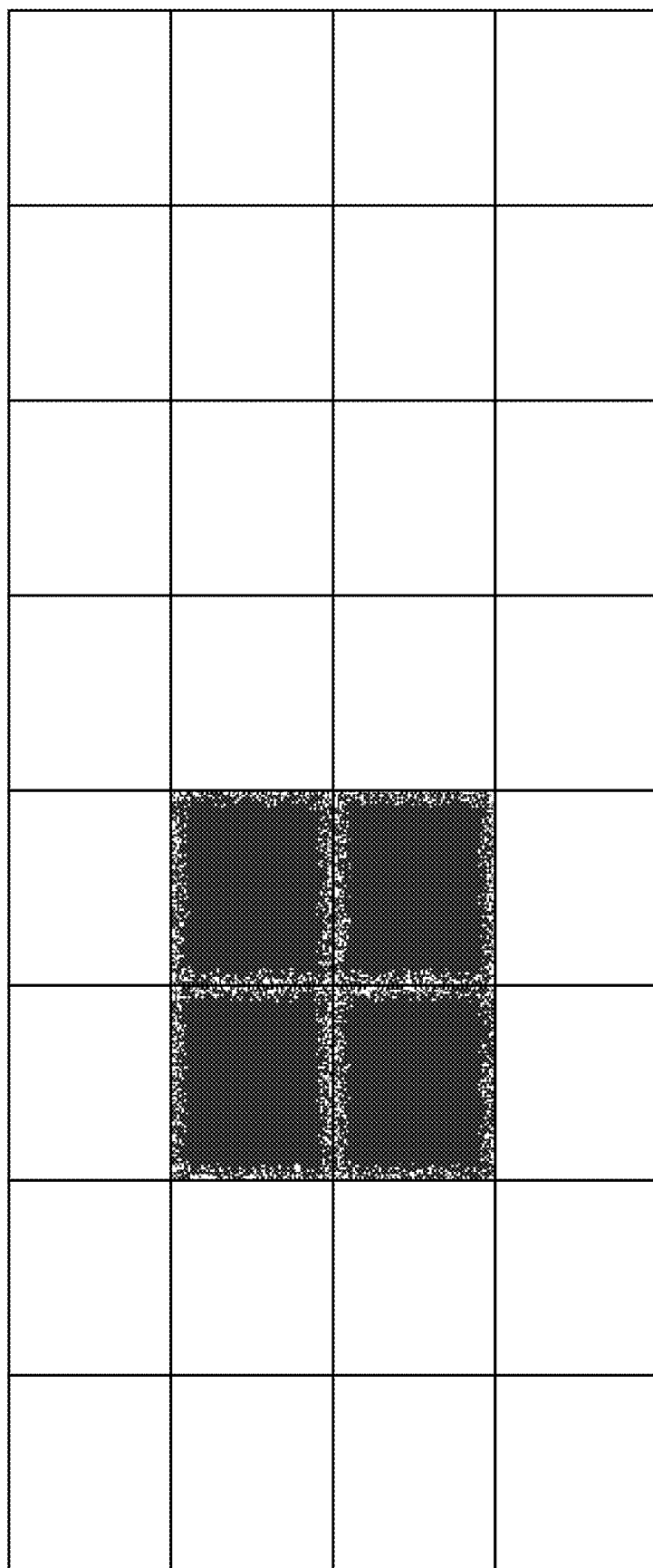
FIG. 11 is an illustration depicting a field of view of the LIDAR apparatus of FIG. 1 divided onto selectable tiles.

In a specific mode of implementation, the LIDAR operational profile conveys the following controllable parameters of the LIDAR apparatus 10:

1. Intensity of the light beam generated by the laser source 30. For example, the profile can specify a setting among N possible power settings.
2. Area of the scene that is to be scanned. This setting can be characterized in numerous ways. One possibility is to define a window in the overall field of view in which the light beam is to be directed. In a specific example, the field of view can be divided in virtual tiles and the setting can specify which tile or set of tiles are to be scanned. FIG. 11 illustrates an example of a field of view divided in tiles, the arrangement being such that there are four rows of eight tiles each, for a total of thirty-two tiles. The setting can specify a subset of tiles that are to be scanned. For instance, the setting may convey the coordinates of the selected sub-set of tiles, such that the optical beam excursions will be restricted to the requested sub-set of tiles. In the example shown, the highlighted set of four tiles is stated in the profile and the optical beam will be controlled such that it scans the area defined by the four tiles only. Note, the set of tiles do not need to be contiguous. Once the definition of the tiles is provided to the controller 68, the logic of the controller can determine the operational setting of the steering engine in order to obtain the desired beam scan.
3. More generally, the profile can specify more or less resolution in certain areas, whether in the X and Y plane or in the X, Y and Z space and let the controller 68 determine the actual LIDAR apparatus 10 settings to achieve the desired resolution in the desired area. Assuming the field of view is characterized as a series of tiles, the setting can provide an indication of the subset of tiles and the degree of resolution that is desired. The controller 68 would automatically set the various parameters of the LIDAR apparatus 10 such as the beam intensity and steering engine operation parameters, among others.

In a specific example of implementation, the controller 68 may have a library of LIDAR operational profiles. Each entry in this library correspond to a different set of operational settings and the controller 68 is configured to dynamically switch between operational profiles. The input 78 may therefore only convey the index in the library such that the controller 68, upon receipt of the index can identify the requested profile, read the settings in that profile and adjust the operation of the LIDAR apparatus 10 accordingly. The controller 68 switches between profiles as requested by the path planning controller, when the LIDAR apparatus 10 is used in autonomous or semi-autonomous automotive applications. That is to say, the planning path controller determines which LIDAR operational mode is best suited for path planning purposes and issues a request to that effect, which can be the index in the library of profiles.

The lidar receiving stage output also feeds into the controller 68 which essentially reads the output of the APDs, applies algorithms to detect distances for various points in the scene and generates a point cloud, which is a 3D representation of the scene. Optionally, the controller 68 can perform detection in the point cloud to identify objects. The detected objects and the point cloud are output at 88 through the output interface 74. The point cloud is output as a succession of data frames.

The output interface 74 releases the point cloud at 88 and optionally detected objects information. In addition, it releases control signals at 82 to control the laser source 30 and control signals 86 to operate the steering engine. The signals 86 to operate the steering engine include steering commands such as switching signals for each steering stage. For example, the switching signals include a polarization switching signals for the polarization selector 46 and switching signals for the PG 48.

Figure 12:
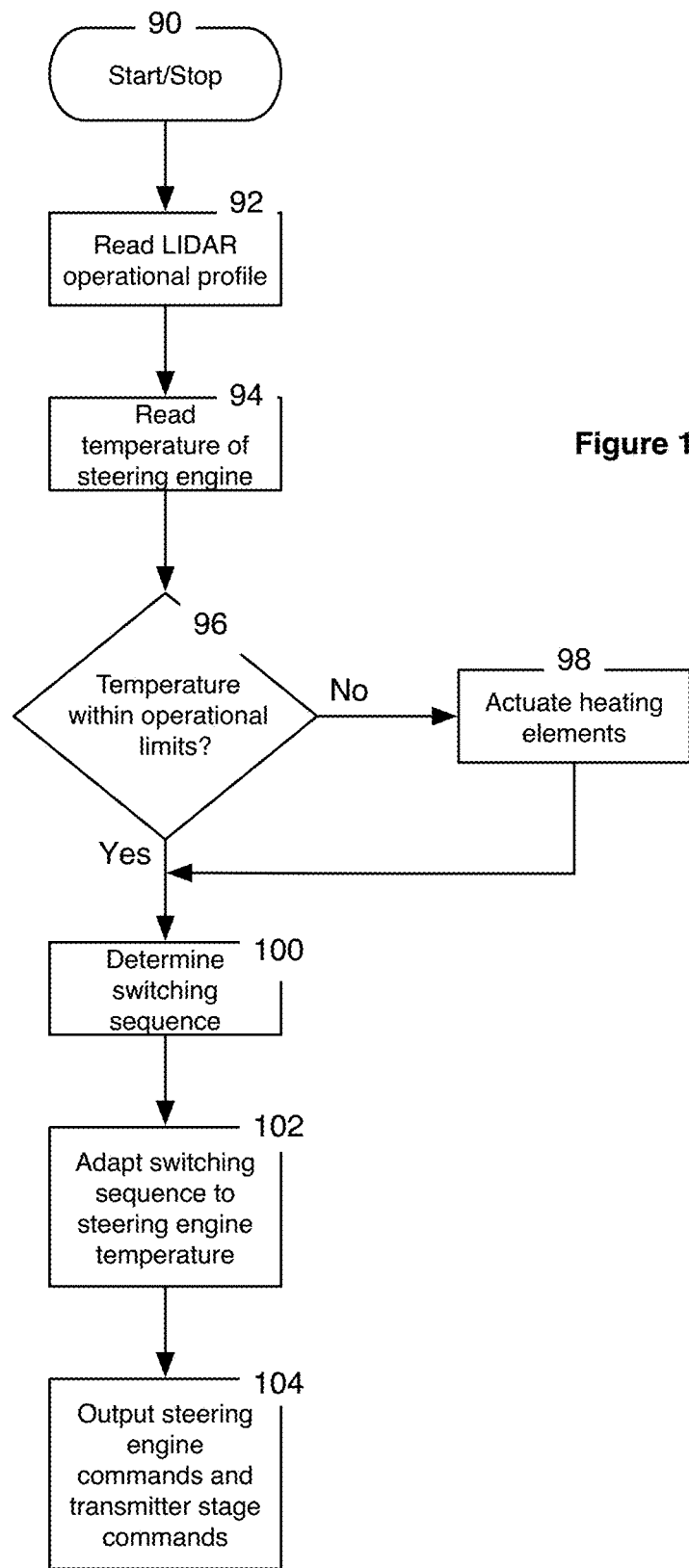
FIG. 12 is a flowchart of a process implemented by the controller shown in FIG. 10.

FIG. 12 is a flowchart of the operation of the controller 68. The process starts at 90. At step 92 the controller 68 reads the requested LIDAR operational profile from the library. At step 94, the controller 68 reads the temperature sensor 76 of the steering engine. For multiple sensors, they are read separately. At step 96, the controller determines if the temperature of the steering engine is in the established operational window. For example, that window can be the shaded area in the graph of FIG. 8. Here, the controller 68 considers that as long as the temperature of the steering engine is above 52 degrees Celsius, the steering engine is in an operational state that meets minimal performance requirements.

Outside this temperature range, the controller 68 may output an error message or a "wait" message to the path planning controller to indicate that for the moment no reliable lidar data is available. Alternatively, the controller 68 may switch to a LIDAR operational profile that does not require repeated switching operations, in particular transitions that require relaxion transitions. For example, the controller 68 may set the operational state to one where the steering engine acts as a pass through where light beam is projected along the incident direction without deflection. In this fashion it is possible to obtain some initial read of the scene that may be usable by the path planning controller to initiate the movement of the vehicle. The controller 68 also notifies the path planning controller that the lidar operational mode that is being implemented is different from the one requested to make sure the point cloud data is interpreted correctly.

At step 98 the heating element is actuated to raise the temperature of the steering stage (s) of the steering engine. It should be noted that the heating operation can be effected to merely bring the temperature of the steering stages within the operational window or at a higher degree that will provide better switching performance. That is to say, the heating will continue beyond the 52 degrees Celsius limit to a higher set point where the relaxation time is near an optimal point. For example, by heating the steering engine to a temperature of 75 degrees Celsius or above, the relaxation time drops to 600 microseconds, while at 52 degrees Celsius it is around 1 millisecond. Accordingly, it is preferred that the heating step 98 is performed in a way to quickly bring the steering engine within the broad operational range and then the heating is managed to keep the temperature of the steering engine within a tighter window where the switching times are improved such that they remain below 1 millisecond, preferably below 800 microseconds and even more preferably below 600 microseconds.

At step 100 the controller 68 determines the switching sequence for the various steering stages of the LIDAR apparatus 10 on the basis of the requested operational profile. That step assumes that since the temperature of the steering engine is now in the correct operational range the default or start-up profile has been replaced with the initially requested profile from the path planning controller.

The switching sequence is the state of the various signals driving the polarization selector and the PG of each steering stage. The switching sequence determines the angular deflection of the beam projected by the LIDAR apparatus into the scene. For a horizontal and a vertical steering LIDAR apparatus, the angular deflection would be characterized by a horizontal deflection angle and by a vertical deflection angle.

Figure 36:
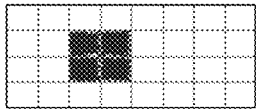
FIG. 36 is a table showing a list of all possible sequences of active tiles.
Figure 36:
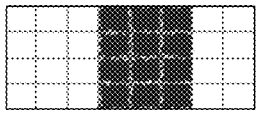
Figure 36:

In a specific mode of operation, the switching sequence is determined by the active tiles specified in the operational profile of the LIDAR apparatus 10. That is to say, a particular sub-set of tiles is mapped to a corresponding set of switching commands that are selected such as to restrict the light beam motion to the active tiles only. The switching commands set the state of the polarization selectors and the state of the PGs of the various steering stages to produce beam deflection angles maintaining the beam within the active tiles. In terms of implementation, the correspondence between the active tiles and the switching commands can be encoded in a look-up table. The entry in the table is the combination of active tiles and the table outputs the sequence of switching commands. A high-level structure of the look up table can be found in FIG. 36.

The table holds the list of all the possible sequences of active tiles that may exist in a profile. The first column in the table shows three exemplary sequences, where each sequence identifies active tiles in the grid of the field of view and corresponds to a specific area of the field of view to be scanned. For each sequence of active tiles, a corresponding switching commands sequence is pre-calculated. A typical switching command sequence would include a set of polarization selector and/or PG settings for each steering stage.

An example of a switching command sequence is shown in the table. That example assumes that the steering engine has two stages (22 and 24). Also note that the values provided in the cells are arbitrary and they do not produce in practice any particular active tile sequence. The values are merely provided to show the kind of information that would be stored in the table.

|  | Steering stage # 2 | | Steering stage # 3 | | |
|---|---|---|---|---|---|
| Command # | Polarization selector (voltage) | PG (voltage) | Polarization selector (voltage) | PG (voltage) | Dwell time |
| 1 | ON | OFF | ON | ON | 50 microseconds |
| 2 | ON | OFF | OFF | OFF | 600 microseconds |
| 3 | OFF | ON | ON | ON | 50 microseconds |

The sequence includes a series of commands, three in the above example, where each command defines the voltages applied to the polarization selector and the voltage applied to the PG of each steering stage, thus defining the deflection imparted to the light beam by that particular steering stage. By cycling the steering engine from one command to the other, the beam walks, step by step. Accordingly, the commands define the motion of the beam such that the beam remains generally in the active tiles. The commands also define the order of the beam steps withing the active tiles, namely the scanning pattern within the active tiles.

When the last command is executed, it is followed by the first command and so on. In other words, the commands form an endless loop and they run continuously, until a new sequence of tiles is requested.

The dwell time is the time delay between the implementation of each command, in other words it is the time the controller 68 maintains the steering engine in the operational mode determined by the active command before changing the voltages to implement the subsequent command. From the perspective of scanning speed, it would be desirable to cycle through the commands as quickly as possible, however, the transition times of the steering stages need to be taken into account in order to let the PS and/or PG stabilize before switching them again. It should be noted that the dwell times are not always the same from one command to the other. For instance, if the switch to the next command from the current command of the steering engine involves switch on time, the cycling can be faster. However, if the current command involves relaxion time, the dwell time will be longer.

At step 102 the dwell times for the selected switching sequence are adapted according to the current temperature of the steering stages of the steering engine. Assume for instance that the LIDAR apparatus 10 is not yet at the optimal temperature, but within the minimal performance temperature window. The dwell times can be adjusted to take into account the increased relaxation times by adding more delay for commands that involve PS and/or PG relaxation. However, as the temperature progressively increases, the dwell time is dynamically adapted to pull delay as the relaxation time of the PS and/or PG decreases. Accordingly, as the temperature increases, the scan speed will also increase up to a point where it stabilizes when the steering engine temperature reaches the optimal temperature.

Figure 13:
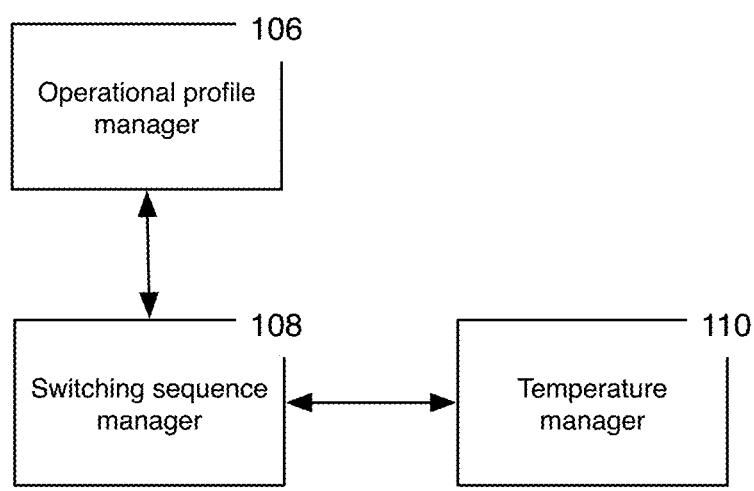
FIG. 13 is a block diagram of the software implementing the functionalities of the controller shown at FIG. 10.

For further clarity, FIG. 13 is a block diagram illustrating the functional blocks of the software executed by the controller 68 and which implements the above functionality. The software has an operational profile manger functional block 106, a switching sequence manager functional block 108 and a temperature manager 110. The operational profile manager 106 will interpret the specified operational profile of the LIDAR apparatus 100 and extract the relevant settings such as laser power, and active tiles in the field of view. The switching sequence manger 108 will determine the switching sequence on the basis of the active tiles and other relevant settings that obtained from the operational profile manager 106. As to the temperature manager 110, it controls the temperature of the various steering stages of the steering engine and modulates the switching commands. It should be noted that the logic for performing the above functions, as described above uses look-up tables, but this is not a strict requirement as different implementations are possible. For example, a software model of the steering engine may be provided which takes as an input the active tiles or any other form of characterization of the desired operation of the lidar and outputs switching commands to achieve that operation.

Referring back to the flowchart of FIG. 12, at step 104 the controller 68 thus outputs the steering engine commands as described earlier which are temperature compensated and also commands to operate the transmitter stage, in particular commands to modulate the light intensity.

Note that for applications that use a first steering stage with a continuous motion optical element, additional settings in the operational profile will be necessary to control the motion of the optical element.

Figure 14:
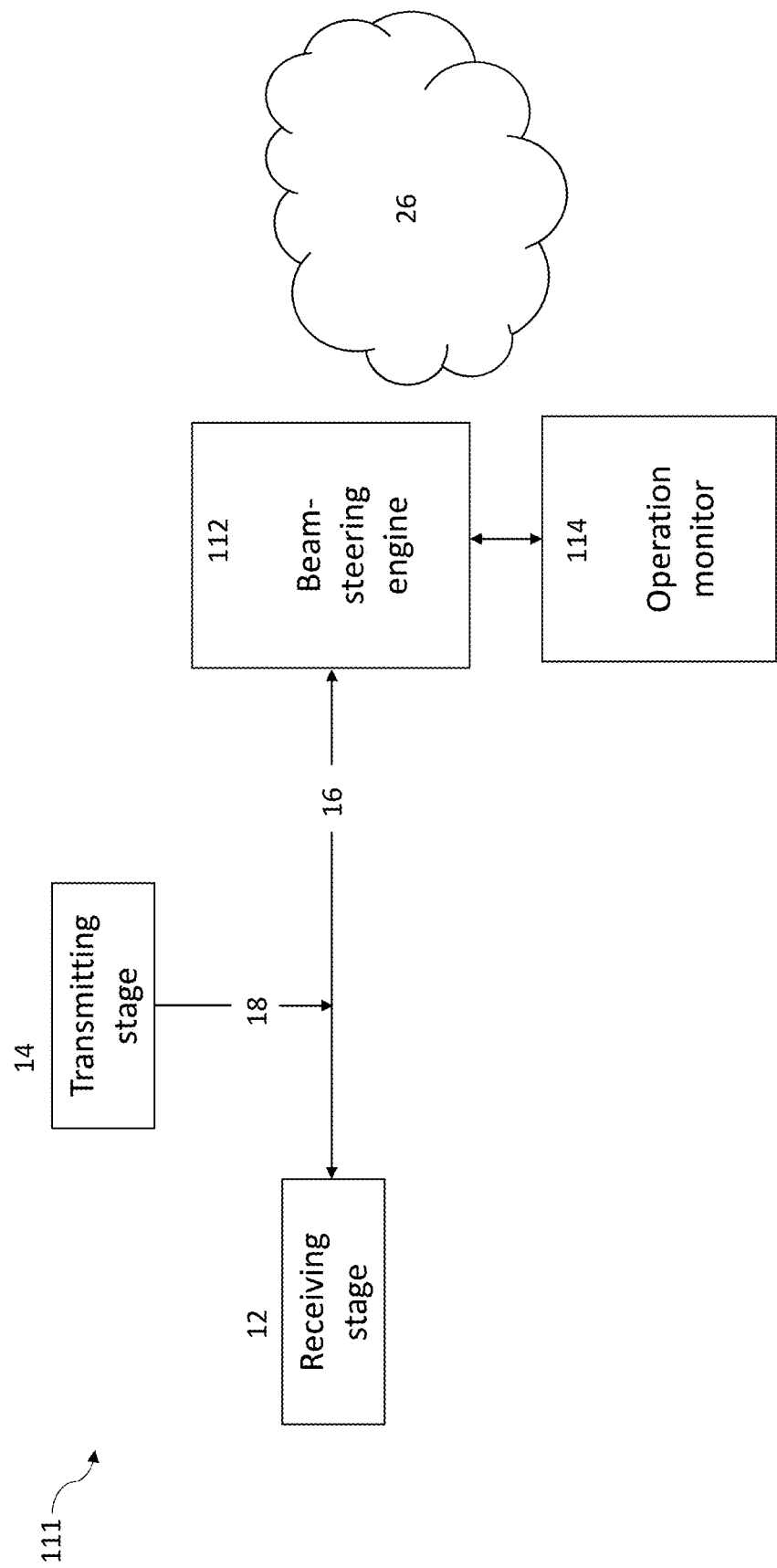
FIG. 14 is a block diagram of a LIDAR apparatus according to another example of implementation of the invention, using an operation monitor.

With reference now to FIG. 14, a further variant of the LIDAR apparatus will be described. Elements that are similar or identical with those of the previously described embodiments will be designated by the same reference numerals. The LIDAR apparatus 111 has a beam-steering engine 112, which can use optical components of the type described earlier and that induce a discrete angular deflection of the light beam or MEMS type light-beam deflection devices that can deflect the light beam in a range of directions by moving the light beam with a continuous movement. The LIDAR apparatus 111 has an operation monitor 114 that monitors the operation of the beam-steering engine 112, in particular the performance of the beam-steering engine 112.

The operation monitor is preferably software implemented and can be standalone unit or integrated into the controller 68.

Generally, the operation monitor 114 is configured to monitor the beam-steering function of the beam-steering engine 112. For instance, the operation monitor 114 can be configured to detect discrepancies between the steering commands that are being input into the beam-steering engine 112 and the execution of those commands by the beam-steering engine 112. A detectable discrepancy can be an angular deflection discrepancy. That is to say, the steering commands require a certain angular deflection of the light beam while the beam-steering engine produces a different angular deflection of no deflection at all. In another example, a detectable discrepancy can be a temporal discrepancy. The steering commands trigger a light beam deflection, but the beam-steering engine executes the deflection with a lag or not at all.

These two examples of discrepancies are usually indicative of either a faulty beam-steering engine or one that has not yet reached an adequate operational temperature, in case of a beam-steering engine 112 using a switchable polarization optical component such as a polarization selector and/or a polarization grating. These are hard fault conditions where the beam-steering engine 112 simply does not operate properly and should not be relied upon for generating perception data. The operation monitor 114 can thus be used to detect the exitance of such occurrences and notify the controller 68 that can either stop using the LIDAR apparatus or default the LIDAR apparatus to a default or a fail-safe mode. The fail-safe mode is a default function where the LIDAR apparatus 111 is still operational but in a limited way, for instance, the beam-steering engine 112 is not able to deflect the light beam. So, in such example, a fail-safe mode is one where the LIDAR apparatus 111 is not capable to scan the scene 26 and can only project light in a fixed direction, say straight ahead. The perception information that is derived from the LIDAR apparatus 111 in a fail-safe mode is still useful but in a limited way.

In another example, the operation monitor 114 is configured, in addition to detecting discrepancies, to monitor the beam-steering performance of the beam-steering engine 112 and adapt one or more parameters of the LIDAR apparatus 111 to the current operational state of the beam-steering engine 112. For instance, as it was indicated in relation to a previously described embodiment, a parameter of the LIDAR apparatus that can be adapted is the timing of the switching sequence to switch a polarization selector and/or a polarization grating.

Figure 15:
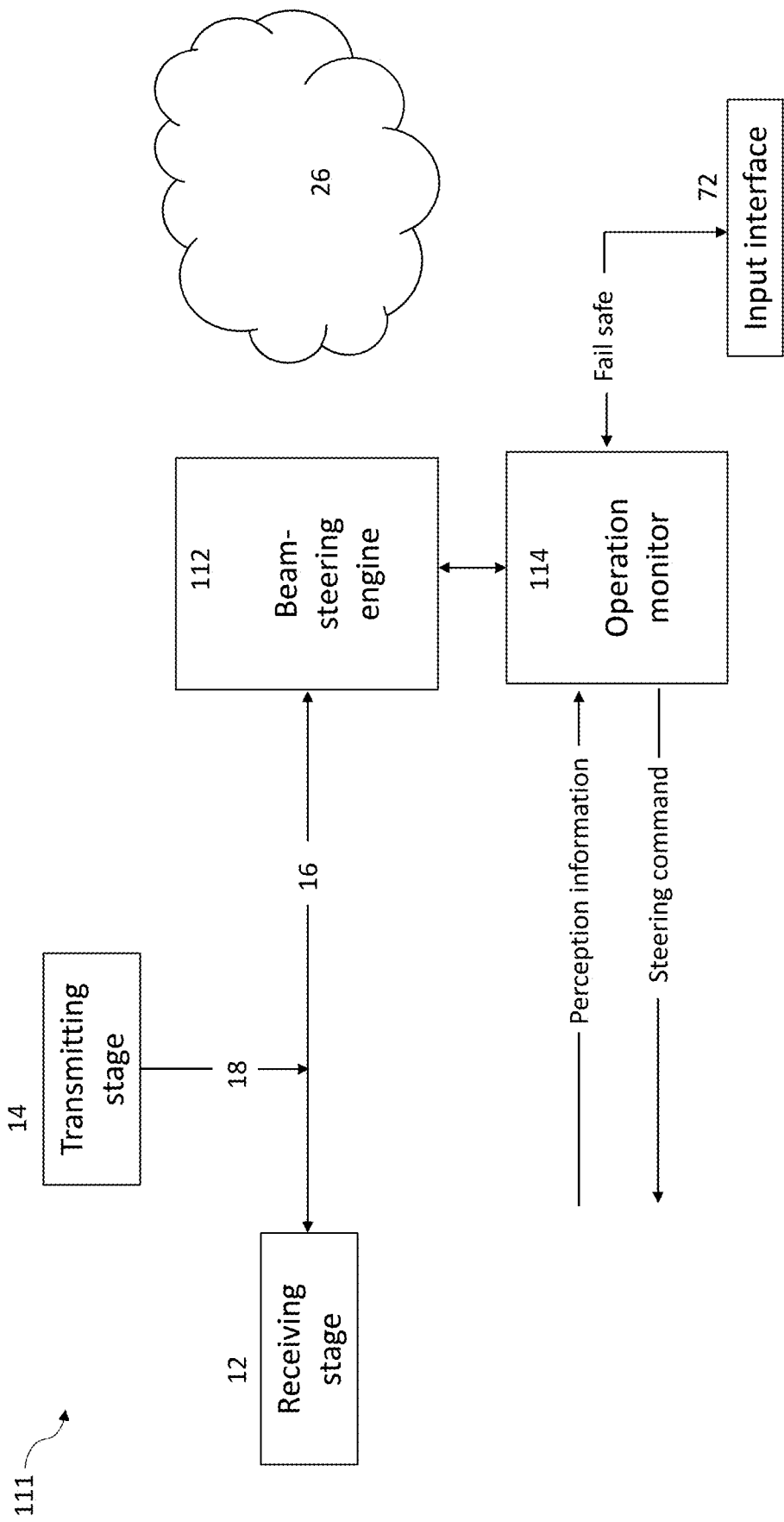
FIG. 15 is block diagram of a LIDAR apparatus which is a variant of the example shown in FIG. 14.

Specific examples of various embodiments of the operation monitor 114 are described below. With reference to FIG. 15 which illustrates a more detailed block diagram of the LIDAR apparatus 111, the operation monitor 114 receives as an input perception information which conveys a representation of the scene as the scene is scanned by the LIDAR apparatus 111. The perception information can be derived from the point cloud that is generated by the LIDAR apparatus 111 or derived from the point cloud supplemented with additional data that represents the scene, such as camera image data of the scene. The operation monitor 114 includes logic that processes the perception information to determine if it is consistent with the steering commands that drive the beam-steering engine. Since the beam-steering operation directly determines the perception information, beam-steering malfunctions will be reflected in the perception information.

The process performed by the operation monitor 114 will be described in relation to the flowchart of FIG. 16. The process starts at step 118. At step 120 the steering commands that drive the beam-steering engine 112 are received by the operation monitor 114. In this example, the steering commands can be the switching commands that drive one or more beam deflection stages of the beam-steering engine 112. Alternatively, the beam-steering commands can broadly convey information about which portion of the scene the beam-steering engine is supposed to sweep. In this instance, the operation monitor 114 has no visibility on the individual switching commands, rather it sees what the effect of those commands are supposed to achieve in terms portion of the overall scene to scan.

At step 122 the operation monitor receives perception information, which conveys a representation of the scene that is scanned by the LIDAR apparatus 111.

At step 124 the logic determines if the perception information is consistent with the steering commands. Several possibilities of making this determination are described below.

If the perception information is derived solely from point could information, in other words, it is only derived from the LIDAR apparatus 111 output, the process buffers the LIDAR data frames and the object detection results in those frames. Since the operation of the LIDAR apparatus and the generation of the LIDAR data frames is significantly faster than the motion of target objects in relation to the host vehicle, a functioning beam-steering engine 112 should not produce abrupt changes in the objects detected in the scene. In other words, if an object suddenly disappears in the scene, that may be the indication of a malfunctioning beam-steering engine 112, where the light is deflected in the wrong area of the scene or for some other reason the scene scan is not done properly. That process is described in greater detail in relation with the flowchart of FIG. 17. The process starts at 128. At step 130 the software buffers previous point could frames and at step 132 object detection is performed to identify objects in the scene. At step 134 the current frame is received and at step 136 objects are detected.

The logic will then identify the portion of the scene that is being scanned by the LIDAR apparatus 111, on the basis of the steering commands. That is to say, the logic will determine what portion of the scene is supposed to be scanned based on the steering commands, say the upper half, the bottom half, the upper right quadrant, the lower left quadrant, etc. Once that portion of the scene is identified from the steering commands, the logic will look back at a few frames to determine if objects have been detected into it. In the affirmative the logic will look if the same objects exist in the current frame in that scene portion. If they do, it means that the beam-steering engine is working properly. If they don't it means that the beam-steering engine or some other component of the LIDAR apparatus 111 is not working properly.

Figure 17:
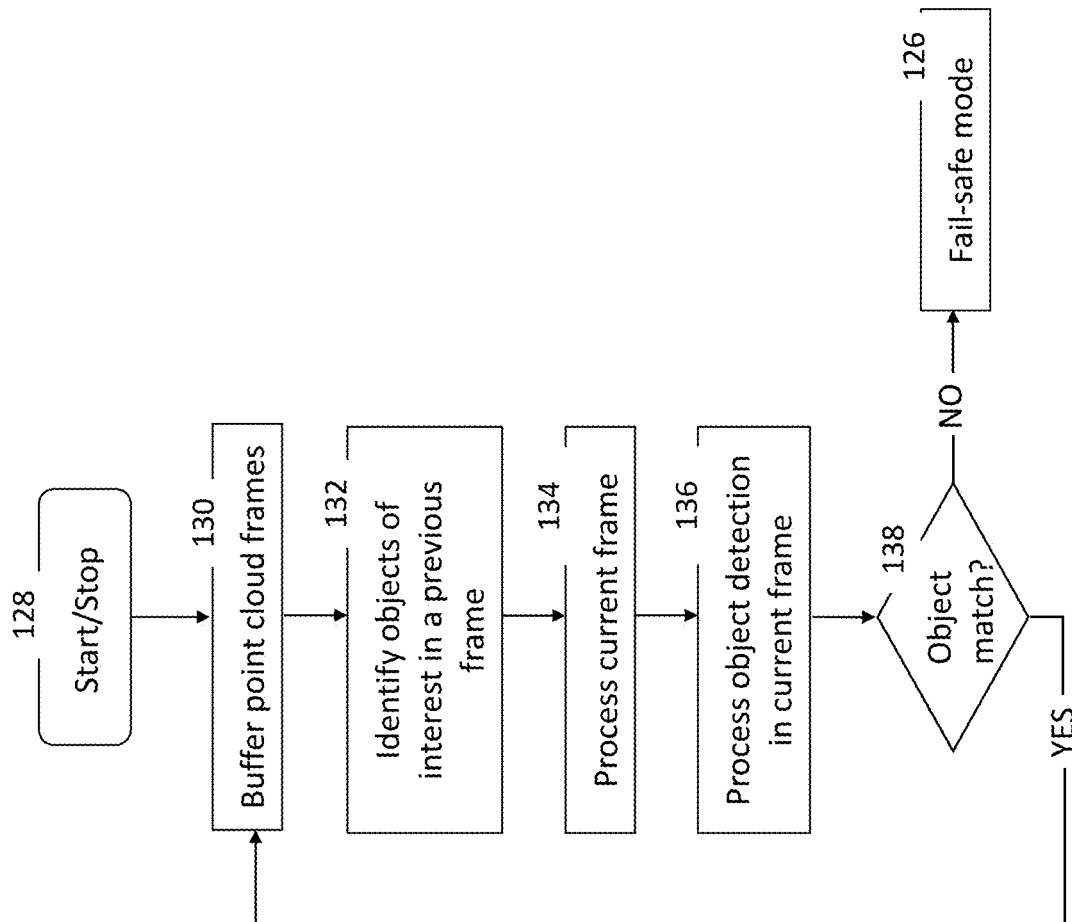
FIGS. 16, 17 and 18 are flowcharts of a processes performed by the operation monitor.

The process described in FIG. 17 is a passive process, in the sense it looks at the flow of the detected objects and based on their position in the scene in the current frame and in previous frames it infers if the beam-steering operation works adequately.

Figure 18:
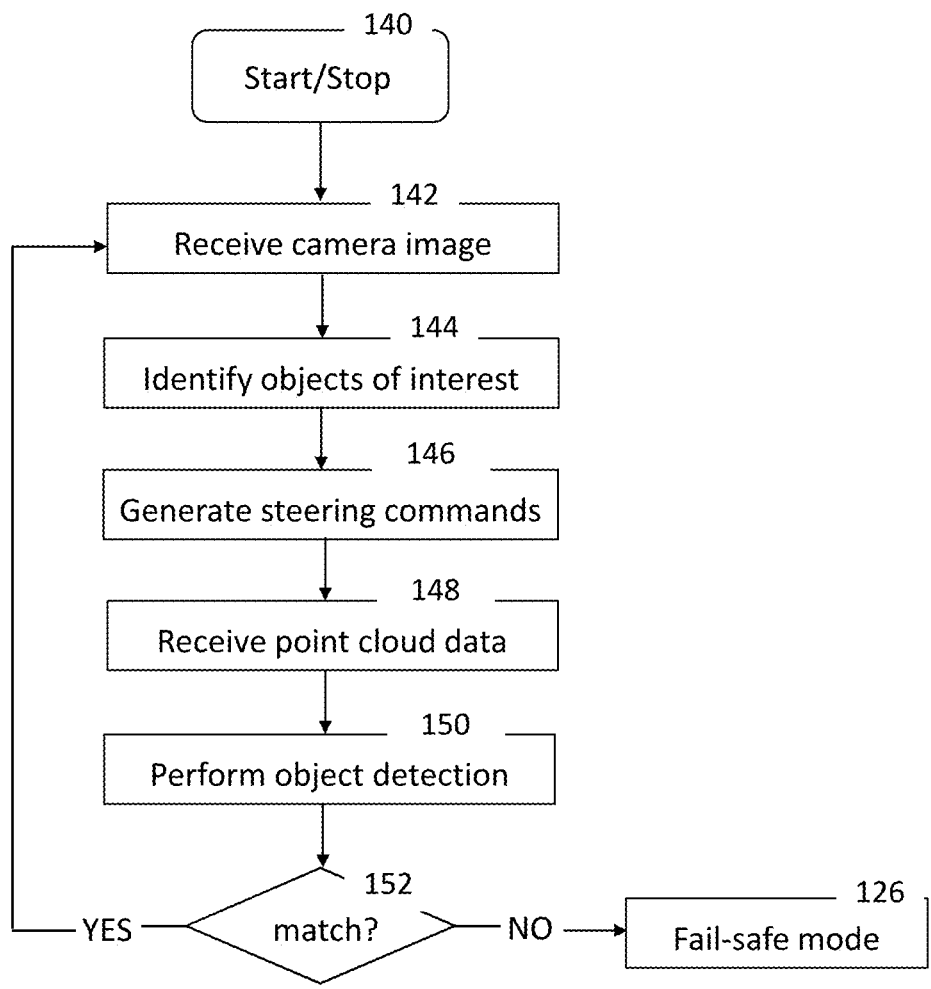
Figure 19:
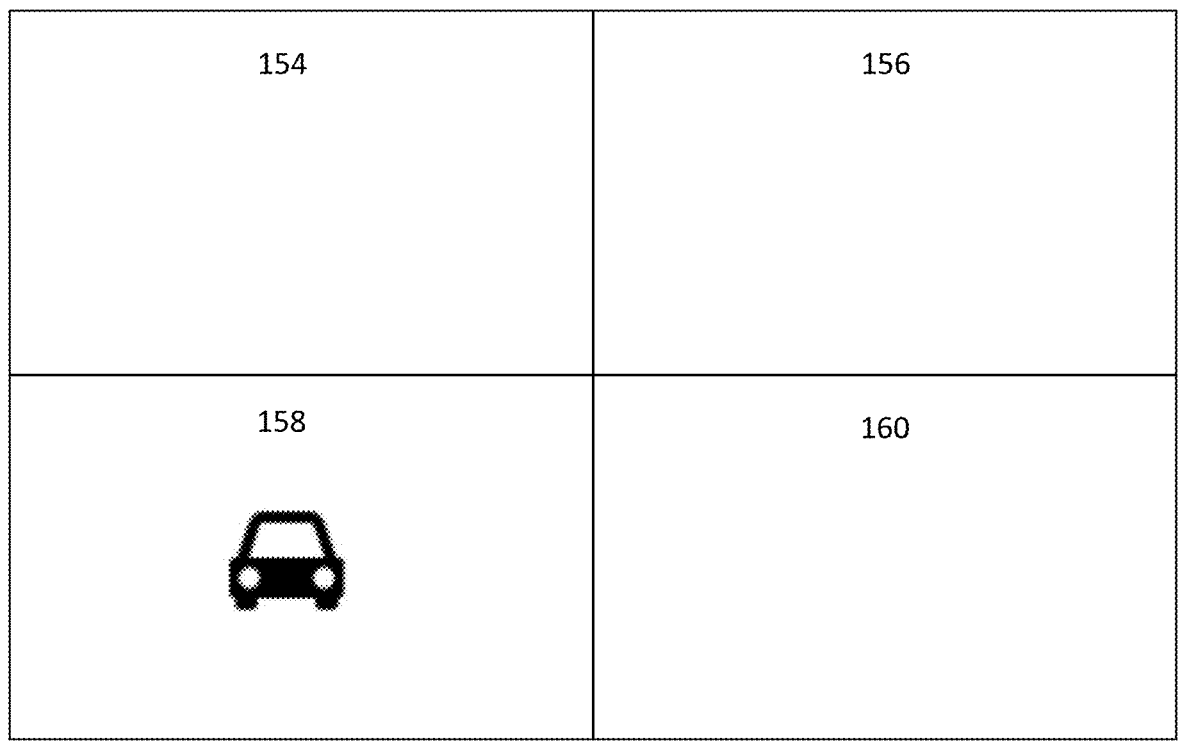
FIGS. 19, 20, 21 and 22 illustrate conceptual templates for image data frames used to monitor the beam-steering functionality of the beam-steering engine.

FIG. 18 is a variant in which the process is active and commands specific light-beam excursions and looks for results in the perception information. The process starts at 140. At step 142 perception information received is derived of a camera image. At step 144 the camera image is processed to perform object identification. The process aims to identify objects in the scene that the LIDAR apparatus 111 that scans the same scene should be able to detect. For instance, image processing with a convolutional neural network can detect vehicles or other objects of interest in the image with relative accuracy. The image processing outputs objects of interest and their location in the scene: upper half, bottom half, etc.

Step 146 generates steering commands to the beam-steering engine to direct the light beam at a portion of the scene containing a detected object in the image frame. It is preferred to select objects that are at the periphery of the scene such as to impose a maximal light-beam deflection to the beam-steering engine and test its operation to the full extent of its operational range. Step 148 receives the point cloud output by the LIDAR apparatus 111 and at step 150 performs object detection in the area of the scene containing the target object (the object detected in the image). If the object is detected as per decision step 152, the conclusion is that the beam-steering operation is adequate, and the process loops back to step 142.

Of note, the diagnostic process depicted by the flowchart of FIG. 18 is an active process in the sense it takes the LIDAR apparatus 111 out of its normal function momentarily to impose beam deflections that may be inconsistent with the information that the LIDAR apparatus 111 is to gather in the context of the current operational conditions of the host vehicle. Accordingly, the testing of the functionality of the beam-steering engine 112 should be done in ways to avoid interfering with the operation of the host vehicle, which could be autonomous driving. It is preferred that the logic identifies proper opportunities to run the diagnostic process that will effectively put the LIDAR apparatus off-line. If the diagnostic process is of short duration, say a second or two, more flexibility exists as the vehicle can operate without the LIDAR apparatus during that short period of time and rely on perception on camera image data and or radar data. A possibility is for the diagnostic process to be triggered during conditions when the host vehicle is in a safe mode, such as when it is stopped. At a red light, which is recognized by the control system of the vehicle, when the vehicle is expected to be immobile for at least a few seconds, the diagnostic mode can be triggered.

Since the extent of the diagnostic check is dependent on the location and number of objects in the scene, it may not be possible to perform a full functional test where each deflection direction of the light beam is validated. For instance, if there is an object in the lower left quadrant in the image data, the steering commands will direct the beam-steering engine to scan that area to validate the beam-steering function in that portion of the scene, however the other three quadrants are not being validated. A possibility is to divide the scene in individual segments and look into the normal image data flow produced during the operation of the vehicle for objects in each segment so identified such as to verify the ability of the beam-steering engine to scan each segment of the scene, hence, to confirm the beam-steering engine is fully functional.

Figure 20:
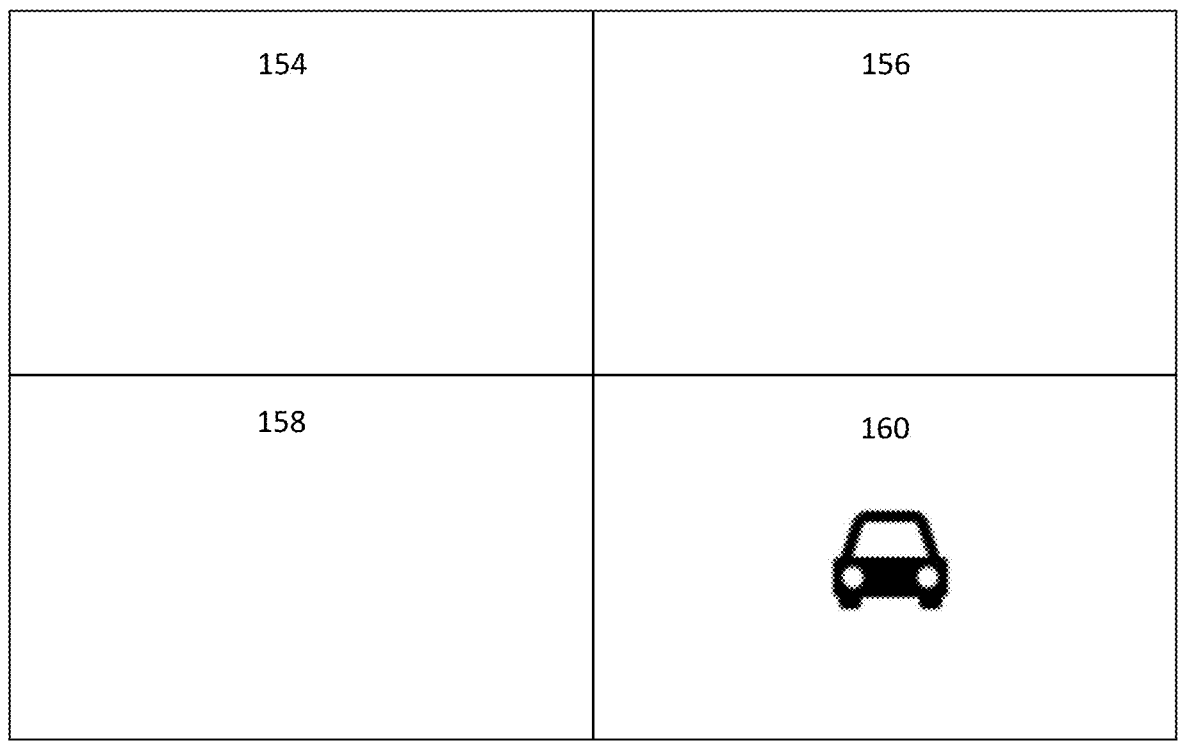
Figure 21:
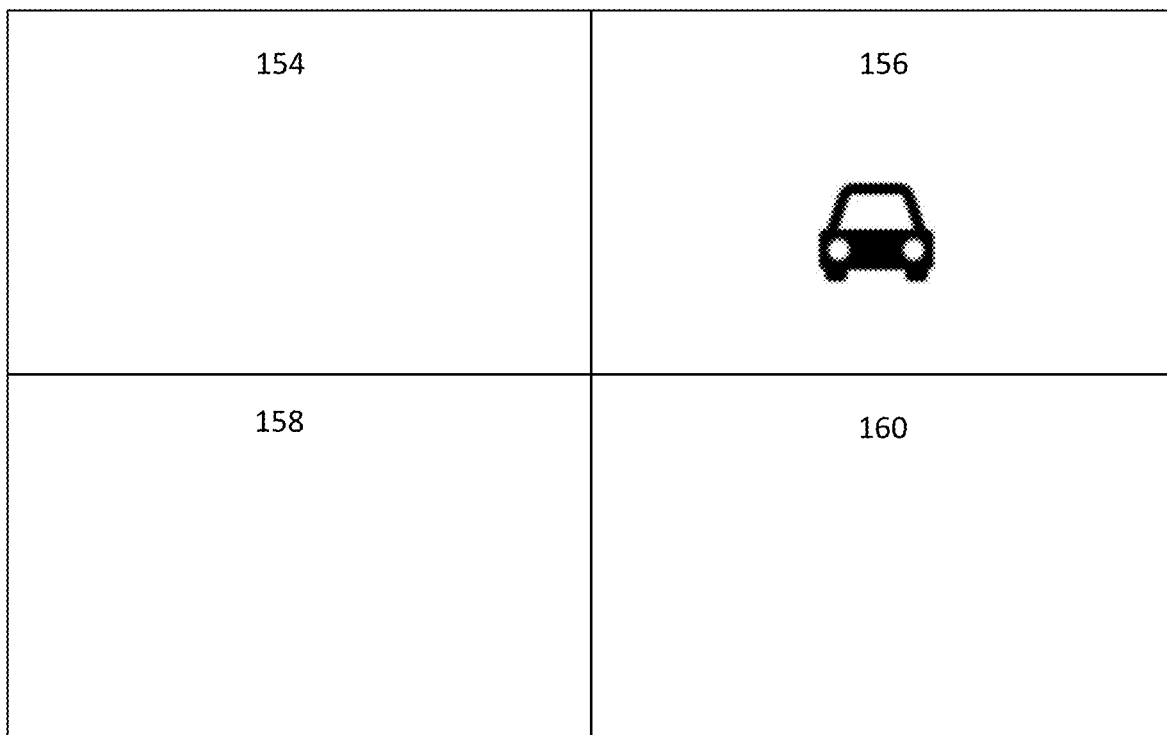
Figure 22:
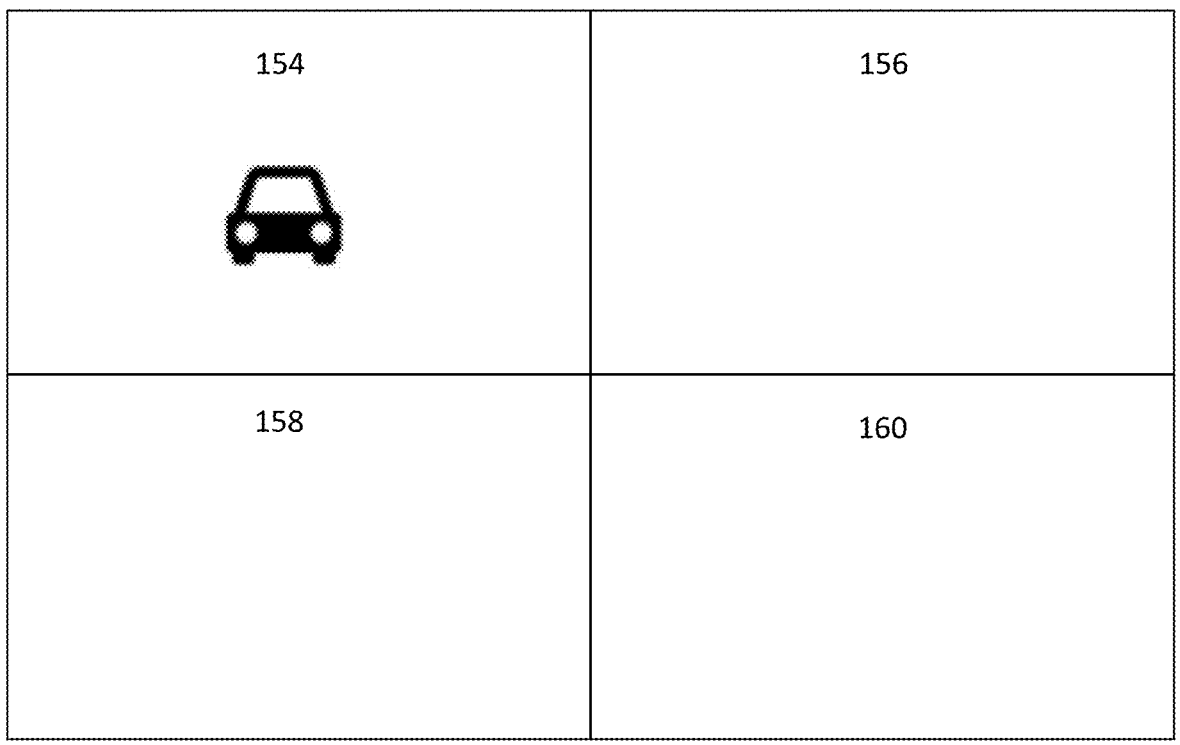

An example is shown in FIGS. 19 to 22. The scene is divided into quadrants 154, 156, 158 and 160. The software will look for image frames where an object, such as a vehicle is found in the lower left quadrant 158. The process illustrated by the flowchart at FIG. 18 is then run to validate the beam-steering function in that particular quadrant. Next, the process moves to the lower right quadrant 160, as shown at FIG. 20. The software will look for an image frame with a vehicle in that quadrant and then run the process of FIG. 18 again to validate the beam-steering operation there. The process is repeated for the upper quadrants 154 and 156.

Since it is unlikely that a single image frame will contain target objects in the four quadrants, the process is done sequentially according to the availably of target objects in the quadrants of interest. Once a full sweep is performed, that is, each quadrant is tested, the process is repeated. It will be noted that the number of subdivisions of the scene can vary. In the above example, the scene is divided into quadrants but more or less areas can be used according to the intended application.

Figure 16:
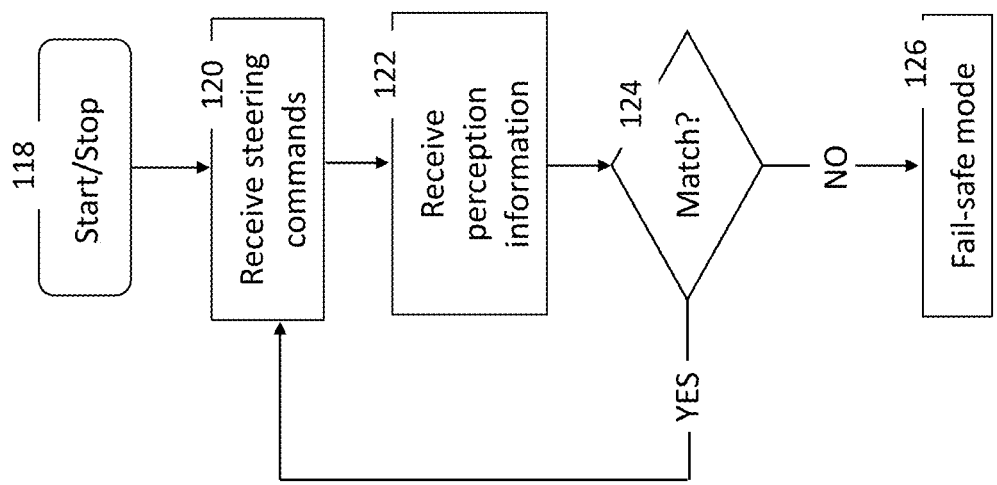

If anyone of the processes in FIGS. 16, 17 and 18 return a no match condition at decision steps 124, 138 or 152, the operation monitor 114 puts the LIDAR apparatus 111 in a fail-safe mode. The fail-safe mode is mode of operation where the functionality of the LIDAR apparatus 111 is diminished, however it can still provide some LIDAR information about the scene. Alternatively, the fail-safe mode may be one where the LIDAR apparatus is set as inoperative and the downstream vehicle motion control system would not use any of the data it generates.

In the case of a beam-steering engine using a polarization grating, the fail-safe mode could be a mode where the beam-steering engine is optically a passthrough component that can transmit and receive light but cannot deflect the light. Depending on the placement and orientation of the beam-steering engine the fail-safe mode can correspond to view straight ahead of the host vehicle. While this is not ideal, the LIDAR information provided in the fail-safe mode is still useful in some driving conditions. As FIG. 15 shows, once the operation monitor 114 has determined that the LIDAR apparatus 111 should be put in the fail-safe mode, it outputs a signal conveying the fail-safe mode to the input interface 72 of the controller 68 (FIG. 10). In turn, the controller will stop issuing beam-steering commands.

In a variant, if the beam-steering engine uses actuators to move optical devices, such as mirrors in order to perform light beam deflection, the fail-safe mode could be one where the optical devices are in their neutral position when no force is applied to them. The system design can be such that in the neutral position it produces a light beam propagation direction straight ahead or in any other pre-determined direction.

Figure 23:
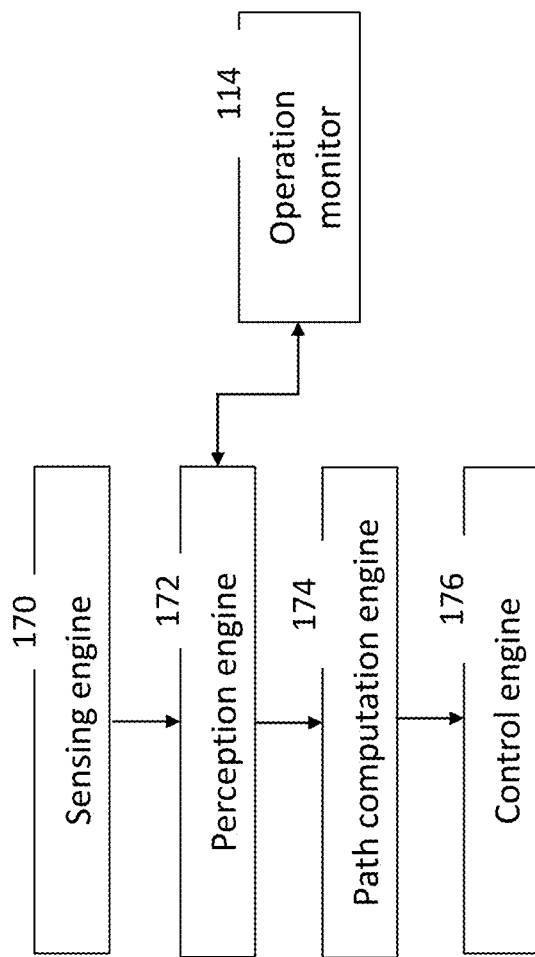
FIG. 23 is a block diagram illustrating the principal components of an autonomous vehicle control system, showing the relationship between the perception engine and the operation monitor.

It should be noted that the object detection in the image data and the point cloud data output by the LIDAR apparatus 111, as exemplified by steps 132, 144, 136 and 150 may be performed independently by the operation monitor 114, but preferably the object detection relied upon is the process that would likely be performed by a perception engine to interpret the scene. FIG. 23 illustrates the process flow that is performed in the context of automated operation of a vehicle and includes a sensing engine 170, a perception engine 172, a path computation engine 174 and a control engine 176. The sensing engine 170 senses the scene topology by a sensor suite, such as the LIDAR apparatus 111, a camera and a radar, among others. The perception engine 172 uses the outputs of the sensor engine to generate a 3D map of the scene and derive semantic information, in other words interpret the scene in terms of objects of interest. The path computation engine 174 uses the 3D map to compute a path for the vehicle and the control engine 176 implements the computed path, namely generating the control signals for the actuators that control the vehicle motion. Since the perception engine 172 would include object detection into the image data and the point cloud LIDAR data, that object detection can be used by the operation monitor 114 to perform the diagnostic process for the beam-steering engine 112. This simplifies significantly the computational load at the operational monitor side.

Figure 24:
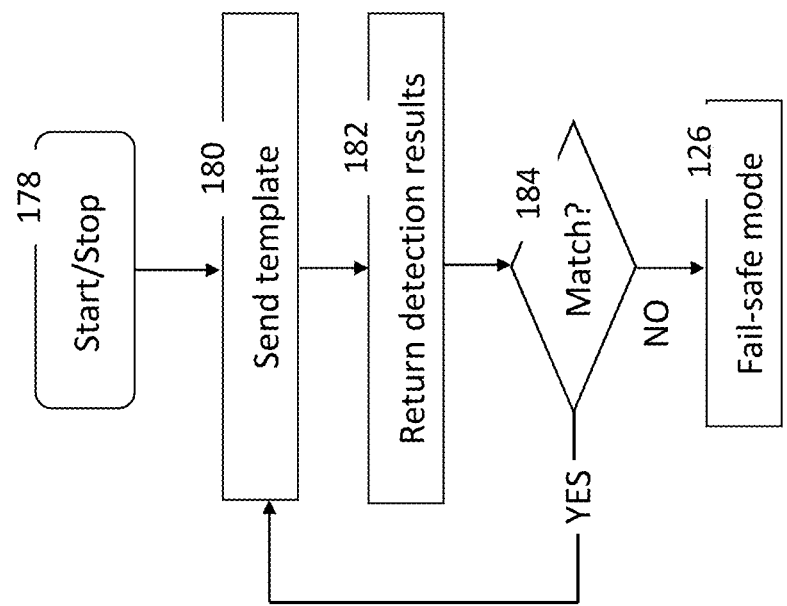
FIGS. 24 and 25 are flowcharts depicting the steps of a process performed to monitor the beam-steering function of the beam-steering engine on the basis of perception information.

FIG. 24 is a flowchart of the process illustrating the interaction between the operation monitor 114 and the perception engine 172. The process starts at 178. At 180 the operation monitor sends to the perception engine 172 a template or a description of a scene configuration the perception engine is to look for in the normal data flow that it processes. For example, the operation monitor sends to the perception engine 172 data indicating it should identify in the camera image data flow image frames with a vehicle in each quadrant of the scene, as shown in FIGS. 19, 20, 21 and 22. For each of those templates, the perception engine 172 returns to the operation monitor 114 at step 182 the detection results in the point cloud data, in particular whether an object was detected in the quadrant. By properly selecting the templates, namely the location of the target vehicle in the scene such that it can be sensed by the LIDAR apparatus 111 only by performing a light beam deflection, the presence of an object in the quadrant, as indicated by the decision step 184, indicates that the LIDAR apparatus is performing adequately. That is to say, the templates, should be such as to look for target objects at the periphery of the scene that require a light deflection to be detected. So, if there is an object in each quadrant, the operation monitor concludes the beam-steering engine is operational.

In this example, the operation monitor 114 could be integrated into the perception engine as a peripheral process to the main perception process flow. The operation monitor process looks at the object detection output from the image data to find objects having certain attributes, such as (1) sufficient size to be detectable by the LIDAR apparatus 111 with a great probability and (2) a location in the scene at one of a series of predetermined scene positions. For any detected object that matches those attributes, the operation monitor looks at the object detection results from the point cloud for a matching object. If a matching object exists, the operation monitor concludes that the beam-steering engine is functioning properly. Otherwise, the operation monitor triggers the fail-safe mode.

The process illustrated at FIG. 24 is a continuous process that is non-intrusive as it does not interfere with the operation of the LIDAR apparatus 111. There may be circumstances where the nature of the scene is such that no naturally occurring range of image frames will arise where the light deflecting operation of the beam-steering engine can fully validated. In such circumstances, it may be necessary to trigger a diagnostic process that will command the beam-steering engine to perform a series of light-beam deflections such that the functionality of the beam-steering engine can be validated. A possible trigger for the diagnostic process that may be used is the result of an object fusion operation that the perception engine 172 could be performing. To elaborate, perception engine 172 can be designed to process two sensing data flows, namely the LIDAR data and the image data by subjecting them to individual object detection operations that detect objects of interest in the LIDAR data and in the camera image data separately. The results of the two detections processes are then merged. If for some reason the beam-steering operation is defective, the merge operation will not function as there will be a significant degree of mismatch between objects detected in the camera image data and objects detected in the LIDAR data. Accordingly, if a certain threshold is reached in terms of object mismatch, the diagnostic process can be triggered to determine if the mismatch is the result of a faulty beam-steering engine or some other problem in the sensing chain, such as a problem with the camera.

Figure 25:
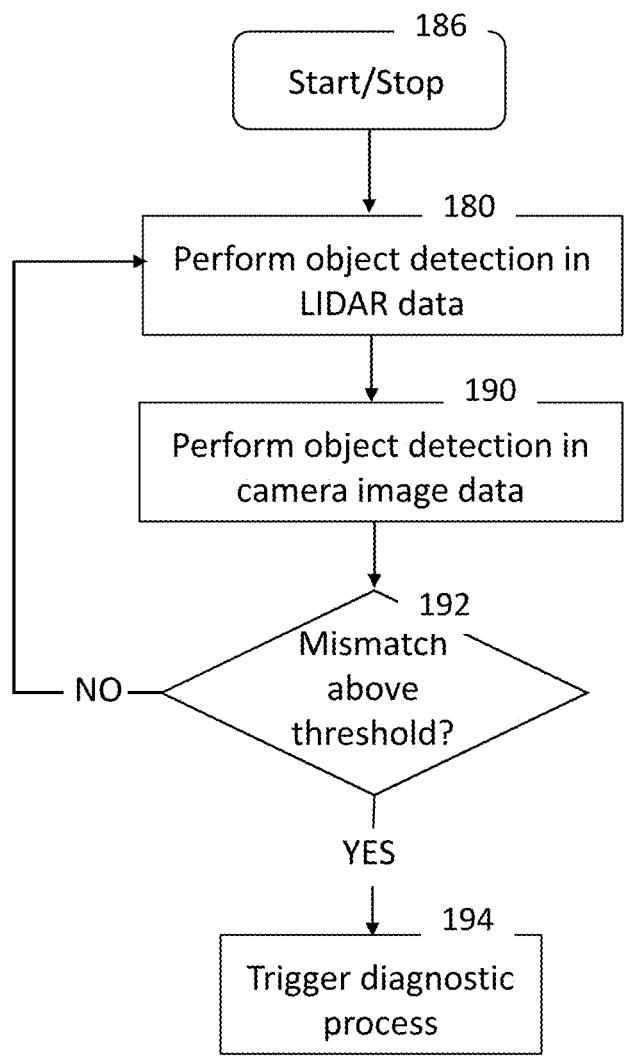

FIG. 25 is a flowchart that exemplifies the process. The process starts at step 186. At step 188 object detection is performed on the LIDAR data. At step 190, object detection is performed on the camera image data. If the decision step 192 shows that there is significant mismatch in the object detection results in both streams, the diagnostic process is triggered at step 194. The diagnostic process will test the functionality of the beam-steering engine 112 but can also test the functionality of other components of the sensing chain, such as the camera, etc.

Figure 26:
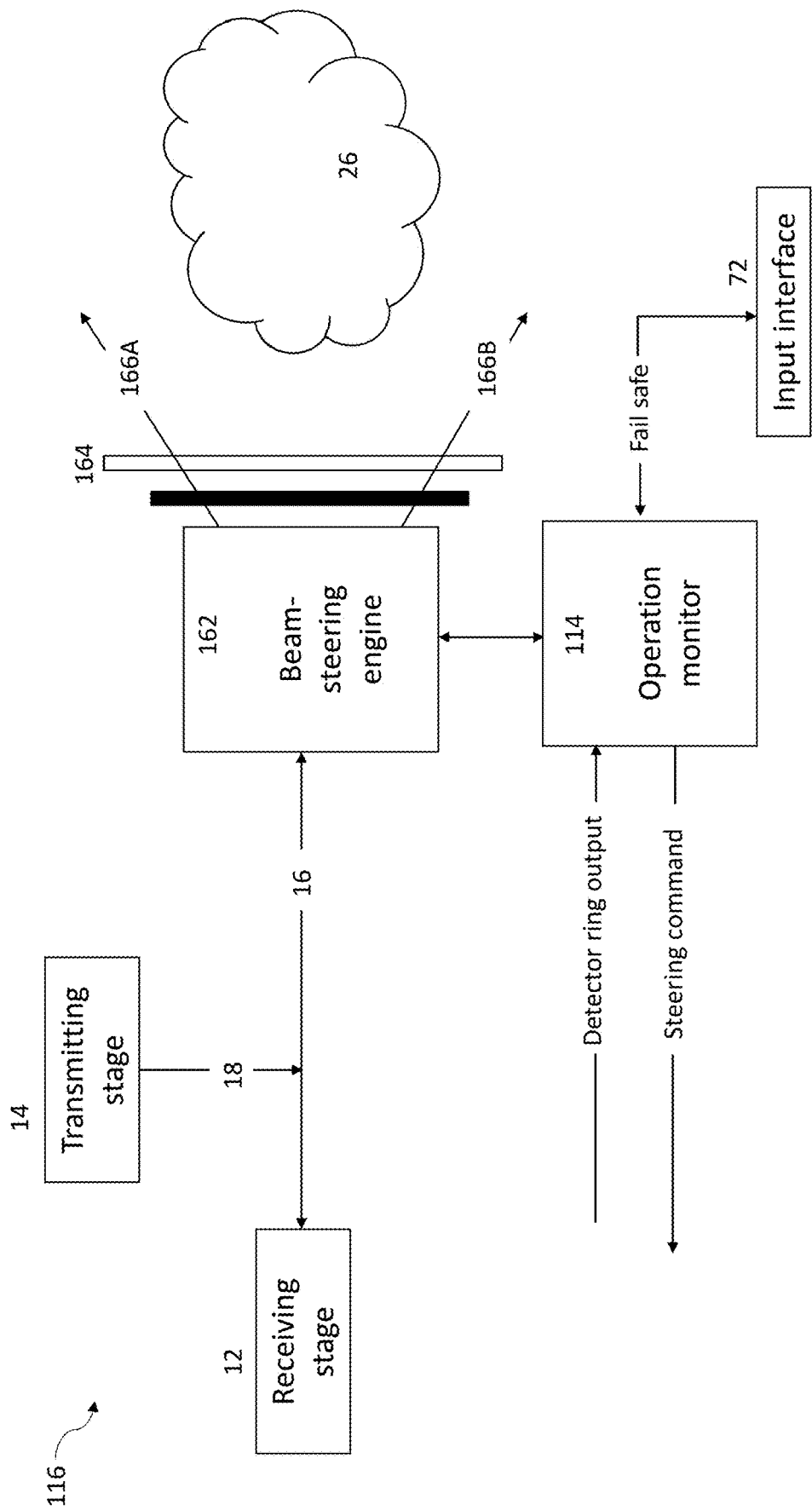
FIG. 26 is a block diagram of a LIDAR apparatus provided with a detector ring for detecting the light beam deflections by the beam-steering engine of the LIDAR apparatus.

A variant of the operation monitor is shown at FIG. 26. That variant uses a sensor to directly sense the light beam deflected by the beam-steering engine. The beam-steering engine 162, which can use a polarization selector and a polarization grating, moveable optical structures such as MEMS or a hybrid arrangement is shown behind a protection window 164 which is transparent to allow light beams to pass through and scan the scene 26 and to receive optical returns. The arrows 166A and 166B illustrate the maximal light beam deflections that can be achieved with the beam-steering engine 162. It should be noted that while two light beam propagation directions are shown, multiple or an infinite number of propagation directions between the two extremes are possible.

A detector ring made up of a string of individual sensor elements is located on the inside face of the transparent window 164. The detector ring is better shown in FIG. 27 which is a planar view of the beam-steering engine 162. In this view, the beam-steering engine 162 is in an orientation such that the light beam input in the optical structure of the beam-steering engine 162 travels in a direction that is normal to the plane of the drawing sheet. Note that the orientation of the view in FIG. 27 is such that the observer looks in a direction from the inside toward the outside of the window 164, that is to say that the face of the window 164 shown in FIG. 24 is the inside face of the window.

As a light beam is output by the beam-steering engine 162 and it travels through the window 164, it interacts with the material of the window 164, as the material of the window 164 does not have perfect light transmissivity. Such interaction effects, which in principle are not desirable because some of the light energy is lost in the process, include reflection, where a small portion of the light beam is reflected backwards toward the beam-steering engine 162 or diffraction effects where a small portion of the light energy is lost through the material of the window 164. By placing a sensor at a location where it can sense the lost energy, it is possible to directly measure the presence of the light beam in a deflected state and thus confirm that the beam-steering operation functions well for that particular light beam deflection direction.

Figure 27:
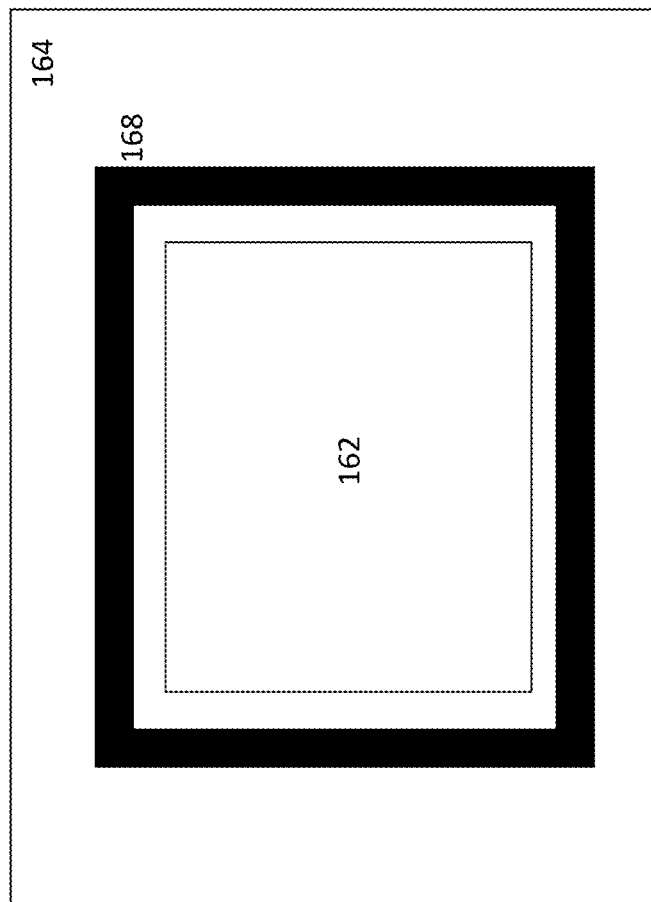
FIG. 27 is a schematical view of the beam-steering engine of the LIDAR apparatus shown in FIG. 26, illustrating the location of the detector ring.

The illustration in FIG. 27 does not show the individual sensing elements, it being understood that their number can vary depending on the desired detection granularity. For a beam-steering engine where the beam can be deflected angularly with high resolution, a larger number of sensing elements could be used in order to verify individual ones of the light beam deflection directions. On the other hand, for a beam-steering engine designed with coarser deflection steps, fewer sensing elements would be required.

In the specific example shown in FIGS. 26 and 27, the placement of the detector ring 168 is such that it can sense a reflection or backscattering of the light beam in anyone of the extreme deflection directions 166A and 166B. Alternatively, the detector ring 168 can be placed outside of the detection window to capture some of the light that scatters as the light beam propagates toward the scene 26. The placement of the detector ring 168 behind the window 164 is preferred as this arrangement provides protection against the elements.

Figure 28:
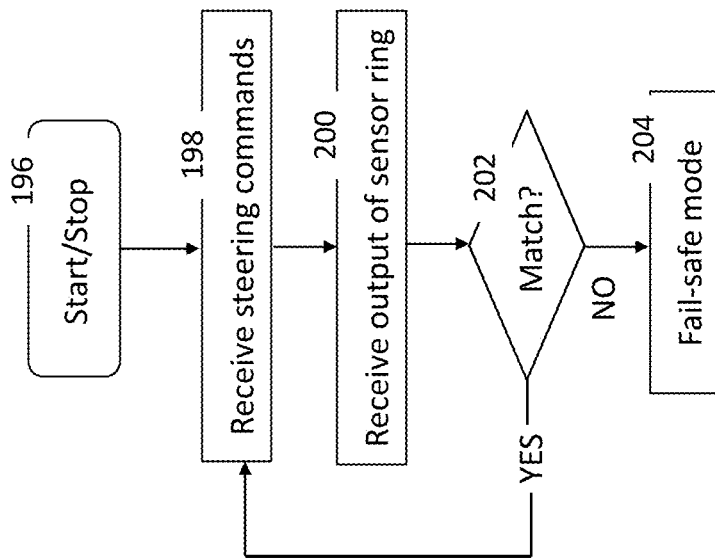
FIG. 28 is a flowchart illustrating the operation of the LIDAR apparatus illustrated in FIGS. 26 and 27.

The process of operation of the example depicted in FIGS. 26 and 27 is illustrated by the flowchart of FIG. 28. It will be understood that this process is executed by the operation monitor 114. The process starts at step 196. At step 198 the operation monitor receives the steering commands. At step 200 the operation monitor receives the output of the detector ring 168, in particular the identification of the individual sensor in the detector ring that has produced an output in response to the presence of a light beam. The operation monitor will then match the particular sensor that has detected the light beam to the steering commands, in other words determine if the steering commands input produce a light beam deflection that is sensed by the correct sensor in the ring. Practically, this can be established via a look-up table mapping steering commands to geometrically corresponding sensors in the detector ring 168. Accordingly, a particular set of steering commands when input in the look-up table will identify the particular sensor in the detector ring 168 that is located in the ring such as to sense the presence of the light beam deflected as a result of the particular set of the steering commands.

If there is a match, as shown at decision step 202, in other words a light beam is sensed and it is located in the right position/orientation in the scene 26, then the operation of the beam-steering engine 162 is confirmed for that set of steering commands. Otherwise, the logic will default the LIDAR apparatus 116 and the processing chain downstream to a fail-safe mode of operation as shown at step 204. That fail-safe mode is communicated to the input interface 72 of the controller 68, to make the controller 68 aware of the operational constraints of the LIDAR apparatus 116, such that processing performed by the controller 68 can be adapted to the current circumstances.

Figure 29:
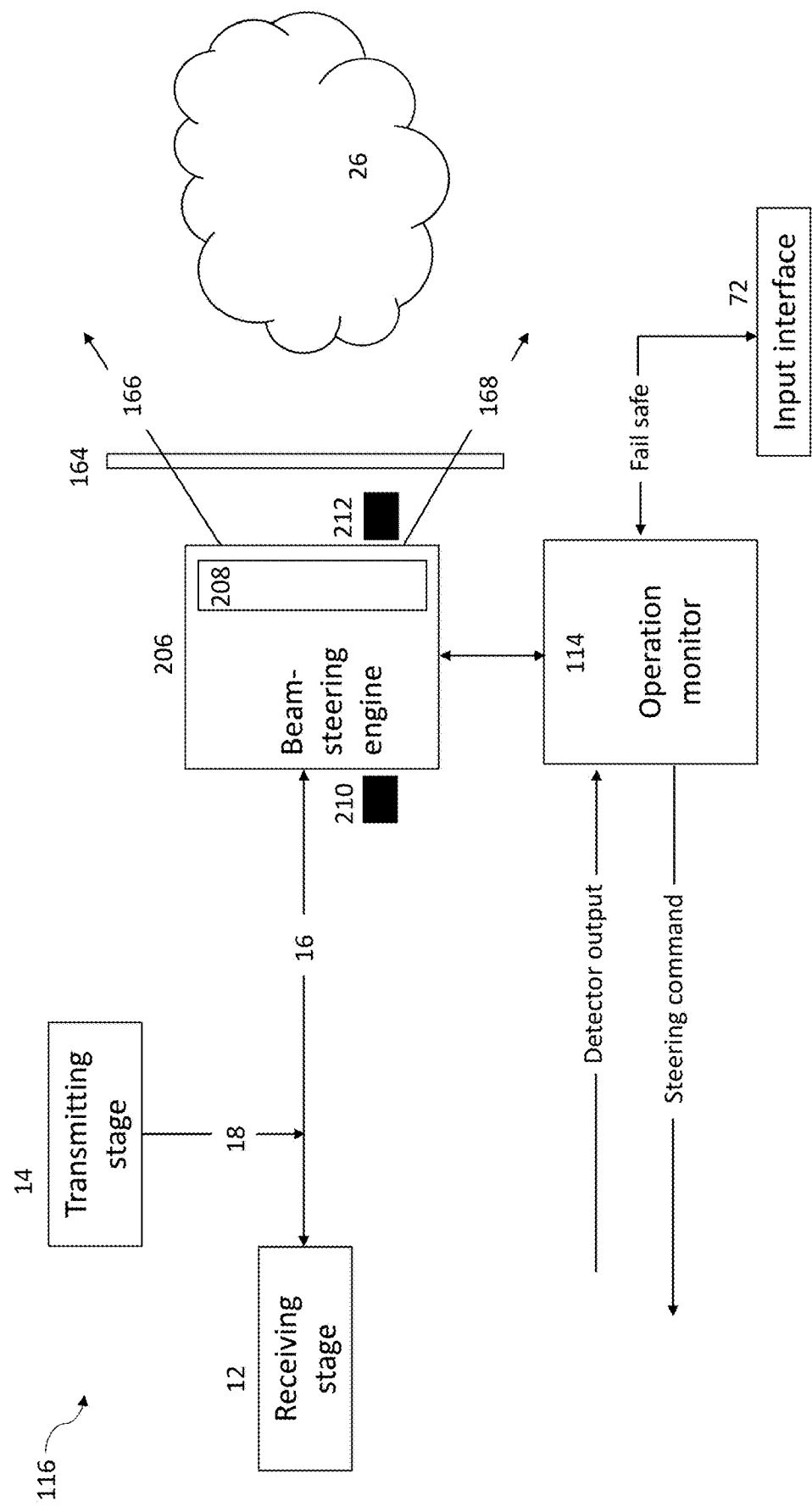
FIG. 29 is a diagram of a LIDAR apparatus according to a variant, using a sensor to directly measure the transition time of one or more optical elements of the beam-steering engine.

FIG. 29 is a block diagram of yet another example of a system to monitor the operation of a beam-steering engine, one that uses a polarization grating. Elements of the system similar or identical to those in previous examples are identified with the same reference numerals.

The beam-steering engine 206 uses an optical component 208 that interacts with the incident light beam to deflect the light beam, as discussed in earlier examples. Specifically, the optical component includes a polarization grating, stacked on other optical components such as a polarization selector that are not shown in the drawing for clarity. A sensor arrangement is provided including a linearly polarized light source 210 of the same design wavelength as the wavelength of the beam-steering engine 206. A light source can be for example a Light Emitting Diode (LED) with a linear polarizing filter, which is oriented at 45 degrees to the principal axis of the beam-steering engine 206. On the other side of the beam-steering engine is provided a light detector 212 with a linear polarizer, which can be aligned with the polarization axis of the light source 210 or flipped 90 degrees.

Assume for the purpose of this example that the beam-steering engine 206 consists of a single stage, where steering commands, in particular switching commands of the optical component 208 change the operational mode of the optical component 208. Since the operational modes of the optical component 208 either preserve the linear polarization of the light or rotate it by 90 degrees, the light detector 212 will see the light projected from the light source 210 only in one of the operational modes.

Figure 30:
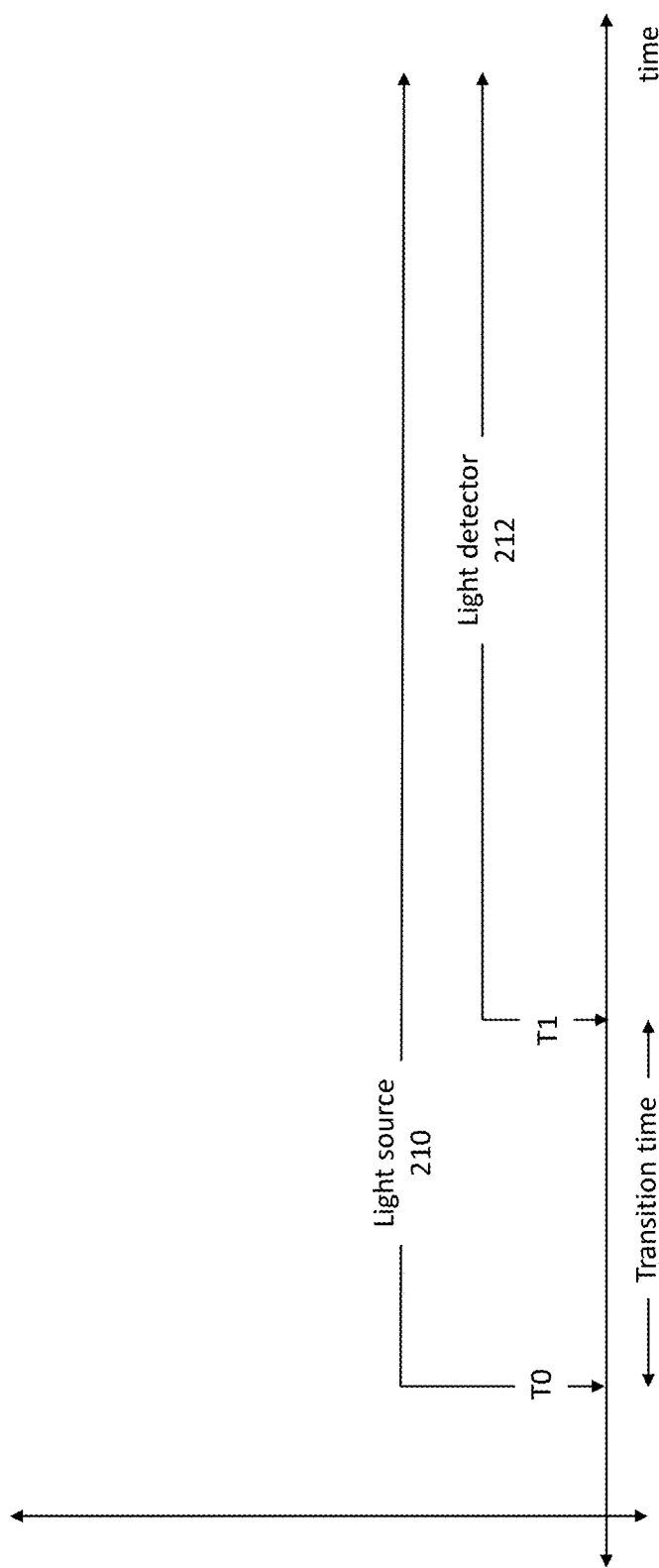
FIG. 30 is a timing diagram showing the relationship between the actuation of a light source of a sensor of the LIDAR apparatus in FIG. 29 and the output of a light detector.

FIG. 30 is a graph showing a timing diagram to illustrate how the transition time, which is the time period necessary for the optical component 208 to switch from one operational mode to another, can be calculated. Assume at T0 light source 210 is activated and assume the optical component 208 is in a first operational mode where light from the light source 210 is not sensed by the light detector 212. For instance, the linear polarization of the light from the light source 210 as it is released by the optical component 208 is such that the light is filtered out by the polarization filter of the light detector 212. That will be the case when the linear polarization of the light is orthogonal to the orientation of the polarization filter of the light detector 212.

At T0 a switching signal is sent to the optical component 208 to switch the grating 208 from the first operational mode to the second operational mode, in which the linear polarization of the light is switched by 90 degrees, where it aligns with the axis of the polarization filter of the light detector 212. Also, at T0 a timer is started.

As the switching signal is applied to the optical component 208, its internal optical structure starts to re-arrange from the first operational mode to the second operational mode. During that transition time the light detector 212 senses no output as the linear polarization of the light is yet not aligned with the axis of the polarization filter of the light detector 212. The alignment occurs at time T1, where the optical structure of the optical component 208 has been re-arranged such that the optical component 208 operates in the second mode. At that time, the light detector 212 shows an output and the timer is stopped. The time interval between T0 and T1 is the transition time required to switch between operational modes. The transition time is dependent on temperature and intrinsic properties of the optical component 208.

In a possible variant, it is possible to use two pairs of light sources/light detectors. The polarization filters are arranged such that in one operational mode of the optical component 208 one light detector manifests an output, while in the other operational mode the other light detector has an output. In this fashion, the light detectors are complementary, when one has an output, the other has none. The transition time could be determined by measuring the time for the outputs of the light detectors to reverse.

Figure 31:
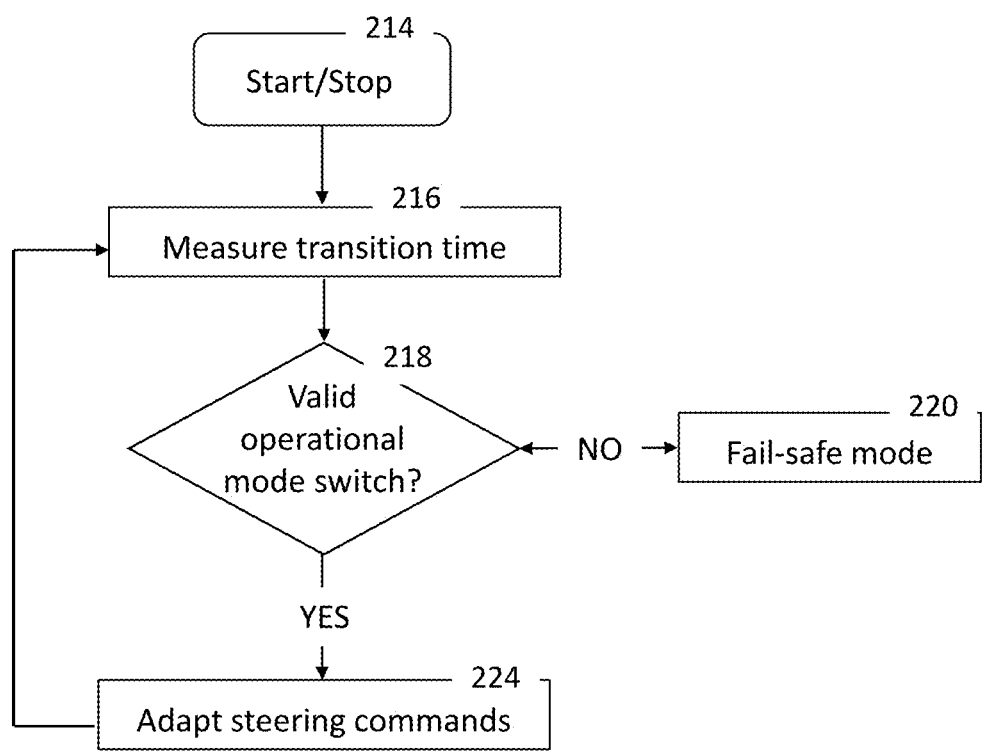
FIG. 31 is a flowchart illustrating a process performed by the LIDAR apparatus shown in FIG. 29.

This embodiment can perform two functions. One function is a verification that the optical component 208 is responsive to switching signals and effectively switches modes when commanded to do so. The other function is to determine the transition time, which in turn can be used to adapt the steering commands, in particular the timing between the switching signals, without measuring or inferring the temperature of the optical component 208. This process is illustrated by the flowchart at FIG. 31.

The process starts at step 214. At step 216 the process will determine the transition time, as described earlier in relation to FIGS. 29 and 30. It should be noted that the arrangement shown in FIGS. 26 and 27 could also be used to determine the transition time. More specifically, at T0 when the switching signal is received, it triggers a timer that is stopped when the detector senses the presence of the deflected light beam.

Decision step 218 will determine if a proper mode switch has occurred. This tests ability of the optical component 208 to respond to switching signals. The operation monitor 114 tests the transition time against a threshold. If the transition time cannot be measured because the polarization grating is into a defective mode where the light detector 212 cannot sense any input, a time out condition at step 218 will determine a fault and lead to step 220. If the measured transition time is below a time out threshold, in other words a valid mode switch has occurred, the processing will continue to step 224 there the adaptation of the steering commands will occur. The measured transition time is input into the input interface 72 of the controller 68 that will use the transition time to adapt the timing of the switching signals to ensure reliable light deflection on the one hand and on the other hand reduce the switching time that would translate into an increased frame rate of the LIDAR data.

Yet another possibility to determine the response of the optical component 208 to a switching command is to issue a command that will put the optical component 208 into a mode that is outside its normal operational range. For example, the switching signal can be set to a higher voltage to "over-drive" the optical component 208 and force a bad response. Such diagnostic switching signal will momentarily create a fault in the LIDAR data flow that can be detected in a number of ways, as previously discussed as the fault will trickle down into the downstream processing performed by the perception engine. If the removal of the diagnostic switching signal clears the fault, the indication is that the optical component 208 responds to switching commands. This test could identify hard fault conditions where the optical component 208 is totally unresponsive.

Another parameter of a polarization grating used in a beam-steering engine is the contrast ratio. The contrast ratio characterizes the proportion of the light energy input into the beam-steering engine that is deflected in the desired direction. A high contrast ratio means that a significant portion of the energy is deflected and directed toward the scene. A low contrast ratio means that a significant component of the light energy leaks throughout the optical structure of the beam-steering engine and it is thus lost.

The contrast ratio is temperature dependent. As the temperature increases, the contrast ratio diminishes, hence the light leakage increases, which has detrimental effects on range as less light energy is directed into the scene. In a specific example of implementation, the contrast ratio can start diminishing at temperatures above 100 degrees Celsius. For instance, when the temperature of the beam-steering engine is elevated from 110 degrees Celsius to 120 degrees Celsius, the contrast ratio diminishes from about 25 dB to about 10 dB. This is a significant reduction that can negatively affect the performance of the LIDAR apparatus.

In applications where the LIDAR apparatus is held at room temperature, such as when the LIDAR apparatus is mounted in the cabin of the host vehicle, the temperature is unlikely to reach the level where the contrast ratio will be negatively affected. However, there may be applications where temperatures in excess of 100 degrees may be encountered and where it is advantageous to manage the contrast ratio in order to maintain the operational performance of the LIDAR apparatus at the desired level.

For example, the LIDAR apparatus can be mounted in a light beam housing of the host vehicle. Current light beam housings have a large transparent window that can contribute to significantly increase the internal temperature due to sun exposure above the temperatures at which the contrast ratio is affected. Moreover, light beam housings are sealed structured to prevent the egress of water or dirt, hence they provide no ventilation of the internal space.

Figure 32:
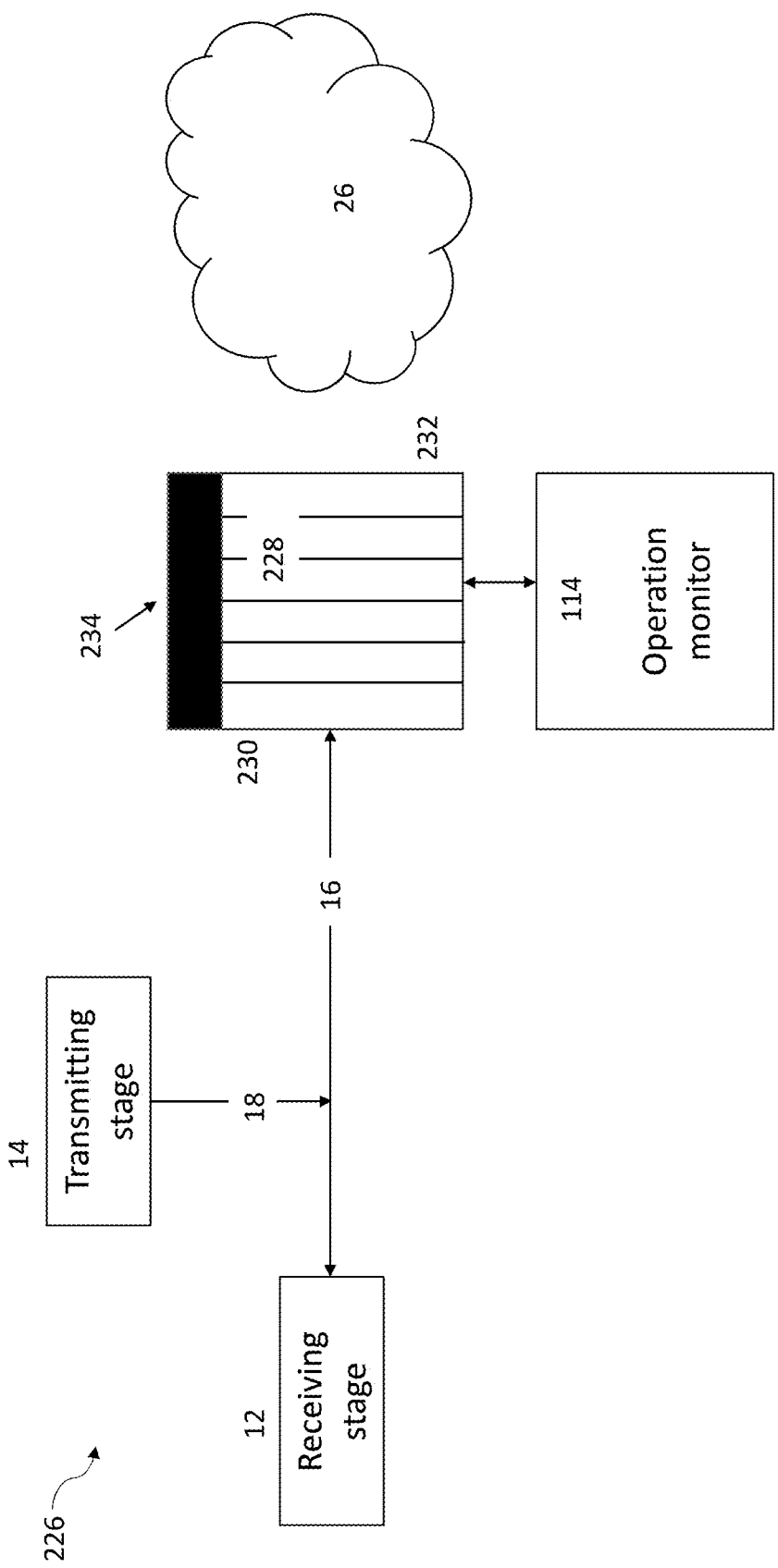
FIG. 32 is a diagram of a LIDAR apparatus with a cooling device to manage the contrast ratio of the beam-steering engine.
Figure 33:
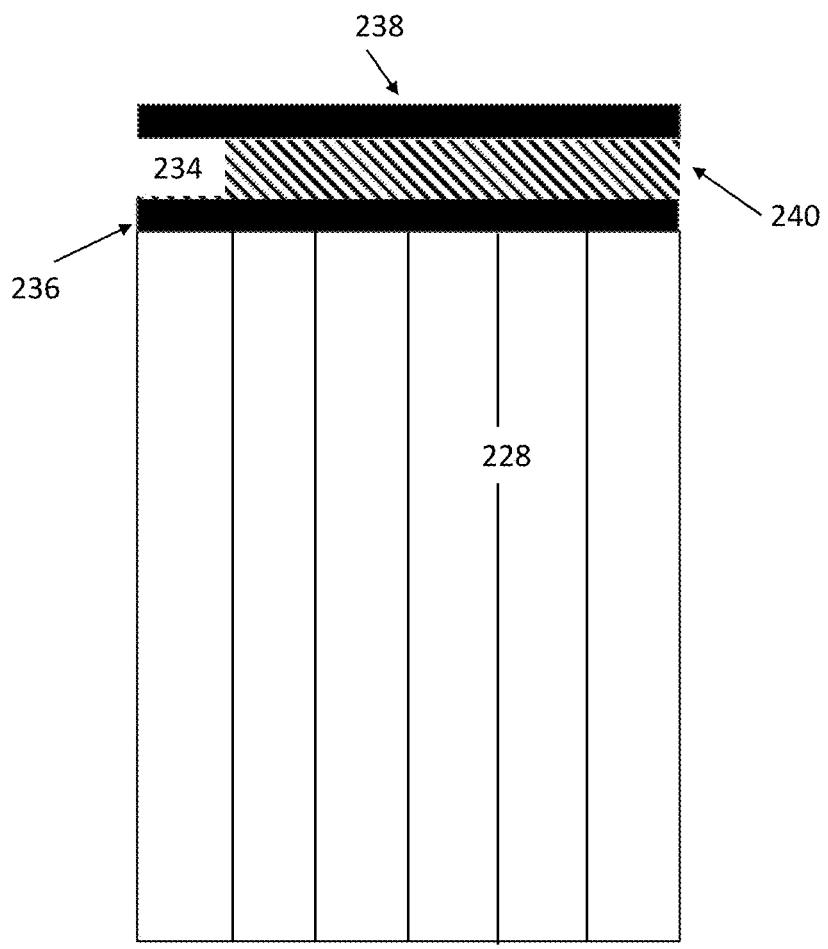
FIG. 33 is an enlarged side view of the beam-steering engine of the LIDAR apparatus shown in FIG. 31, illustrating in greater detail the structure and placement of a heat pump.

One option to manage the contrast ratio is to regulate the temperature of the LIDAR apparatus such that it does not reach such elevated temperatures. To this effect, a temperature management system to keep the operational temperature of the LIDAR apparatus below a threshold is provided. FIG. 32 is a block diagram illustrating a LIDAR apparatus 226 with such temperature management system. As with the previous figures, elements throughout the drawings that are designated with the same reference numerals refer to identical or similar components. The LIDAR apparatus 226 has a beam-steering engine 228 using optical components such as polarization gratings and/or selectors arranged into an optical stack. The optical stack has two primary opposed faces 230 and 232. Light enters the primary face 230 and it is output through the primary face 232. The optical stack has also side faces, the number of which depends on the geometry of the stack. For a square or a rectangular optical stack there will be four side faces. On one of the side faces, is placed a solid-state heat pump 234 operating on the Peltier principle. The solid-state heat pump 234 has a pair of outer metallic plates which provide thermal conductivity separated by a semiconductor layer. When a voltage is impressed across the metallic plates, depending on the polarity, heat present on the first plate is transported toward the second plate. Accordingly, the first plate is cooled while the temperature of the second plate is elevated. By reversing the polarity, the direction of heat transport is reversed and the plate initially cooled is now heated. This is shown in greater detail in FIG. 33 that is an enlarged side view of the beam-steering engine 228. The heat pump 234 has an inner metallic plate 236 which is in contact with the optical stack, in particular in contact with the side faces of the individual optical elements. The heat pump 234 also has an outer metallic plate 238 which is spaced apart from the inner plate 236 by a semiconductor substrate 240. In operation, by impressing across the plates 236 and 240 a suitable voltage with a suitable polarity, the heat pump 234 will transfer thermal energy from the plate 236 to the plate 238. In other words, the plate 236 will be cooled, which will in turn cool the stack 228, while the plate 238 will be heated-up. To evacuate the excess heat on the plate 238 it is preferable to place on it a heat sink. The heat dissipation of the heat sink can be enhanced by providing an air circulation device, such as a fan.

To provide additional cooling each face of the optical stack can be provided with a heat pump. The array of heat pumps can be operated individually or as a unit to cool the beam-steering engine 228.

Since the heat pump 234 is reversible, that is to say that by reversing the voltage impressed across the plates 236 and 238, the thermal transfer occurs in the reverse direction where the inner plate 236 can be heated-up while the outer plate 238 will be cooled. In this fashion, the heat pump 234 can be used to both heat and cool the beam-steering engine 228. Note that the heat pump 234 does not generate thermal energy per se, it merely transfers it from one plate to the other plate, some energy generation mechanism is required such that the optical stack can be heated. That can be an external heating component, which would heat the outer plate 238. In this arrangement, the heat pump 234 is effective to heat the optical stack as it is in direct thermal contact with the stack and also can selectively be switched to a cooling function, thus providing a compact thermal management package.

In a possible variant, a solid-state heat pump that is substantially transparent can be used and it can thus be integrated into the optical path of the optical stack. An example of a transparent thermoelectric material is described in the article by C. Yang, D. Souchay, M. Kneib, M. Bogner, H. M. Wei, M. Lorenz, O. Oeckler, G. Benstetter, Y. Q. Fu and M. Grundmann entitled "Transparent flexible thermoelectric material based on non-toxic earth-abundant p-type copper iodide thin film" and published in Nature Communications on Jul. 6, 2017. Such transparent heat-pump can be placed on the main optical faces of the optical stack and can both heat and cool the stack. An advantage of placing the heat pump in contact with a main optical face is to facilitate the heat transfer to and from the optical stack core as the main optical face has a larger surface area than a side face. In examples of implementation where the transparent thermoelectric structure is the last optical structure in the optical stack in the direction of light propagation through the optical stack, it can be thermally coupled to the outer protection window such that heat can be evacuated efficiently outside of the enclosure in which the LIDAR apparatus 226 is placed.

Another option to manage the contrast ratio, which can be used in conjunction or in lieu of the temperature management described above is to vary the power of the transmitter and thus compensate for the lower contrast ratio in the event the temperature increases. For instance, if the contrast ratio decreases the transmitter is commanded to increase the power output of the laser such that the level of light energy deflected by the beam-steering engine is maintained at the desired operational level.

Figure 34:
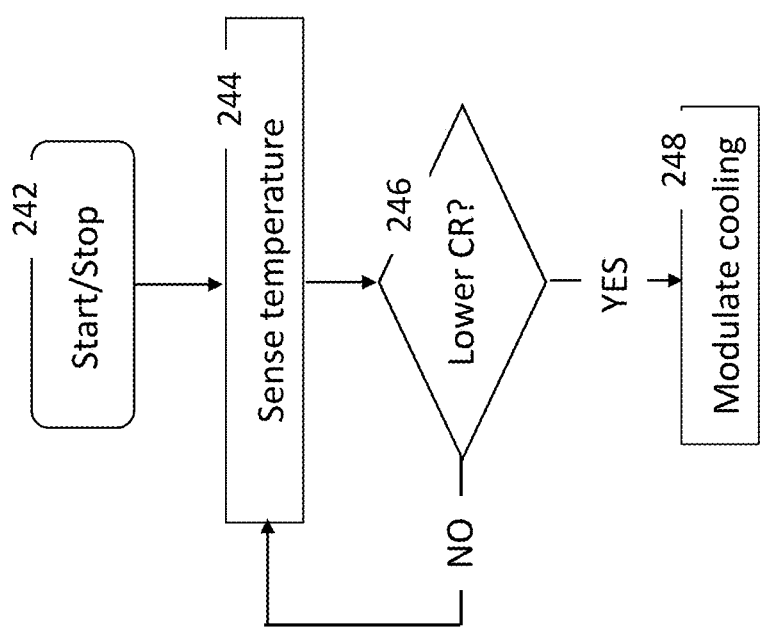
FIG. 34 is a flowchart of a first process for managing the contrast ratio of a LIDAR apparatus.

FIG. 34 is a flow chart of a first example of a process for performing management of the contrast ratio. It is to be understood that the control aspect of the process is software implemented by the operation monitor 114. The process starts at 242. At step 244 the operation monitor 114 measures the temperature of the optical stack. That can be done via a suitable temperature probe located in thermal contact with the optical stack or in the vicinity of the optical stack. At decision step 246, the sensed temperature is compared to a threshold. Practically, this threshold would be a temperature at which the contrast ratio (CR) begins to drop. If the contrast ratio drops, at step 248 the cooling function is activated, for example by triggering the heat pump 234. The operation of the heat pump 234 is modulated according to the temperature: as the temperature increases, the heat pump 234 is driven to cool more.

Figure 35:
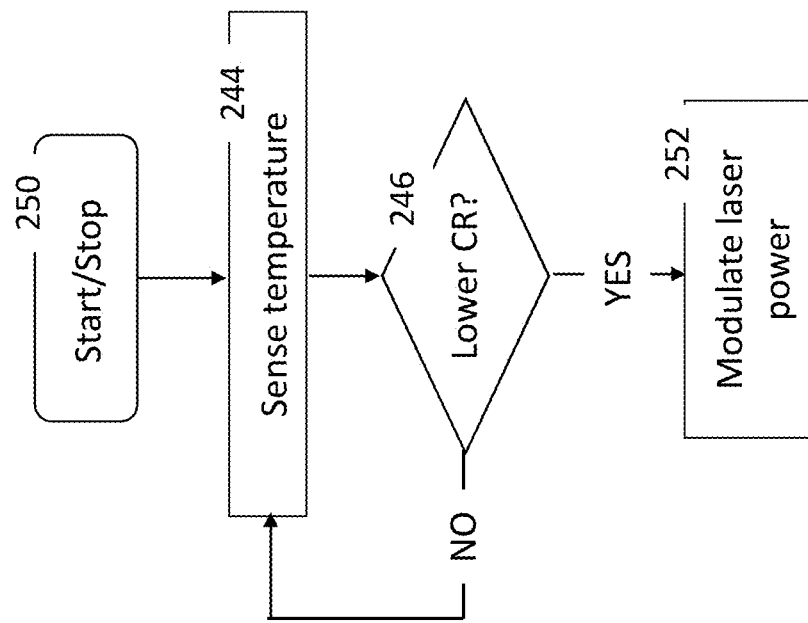
FIG. 35 is a flowchart of a second process for managing the contrast ratio of a LIDAR apparatus.

FIG. 35 is a flow chart of a second example of a process for performing the management of the contrast ratio. Generally, the process is similar to the one described in connection with FIG. 34 with the exception that if the contrast ratio is found to diminish, the laser power of the transmitter is increased to compensate the light leakage.

The invention claimed is:

1. A light beam-steering engine, comprising:
   a. an optical element switchable between a first operational mode and a second operational mode,
   b. in the first operational mode of the optical element the beam-steering engine is configured to output an input light beam passing through the beam-steering engine along a first propagation direction,
   c. in the second operational mode of the optical element the beam-steering engine is configured to output the input light beam along a second propagation direction,
   d. a light-transmissive heating layer;
   e. a timer to measure a transition time period as the optical element switches between the first and second operational modes, wherein the transition time period includes a switching-on time that is characterized by a transition of the optical element from the first operational mode to the second operational mode, and the transition time period includes a liquid-crystal relaxation time that is characterized by a transition of the optical element from the second operational mode to the first operational mode;
   f. when it is determined that the transition of the optical element is implemented from the second operational mode to the first operational mode, the light-transmissive heating layer is configured to heat the optical element to regulate the liquid-crystal relaxation time.

2. The light beam-steering engine as defined in claim 1, wherein the optical element is one of a polarization grating and a polarization selector.

3. The light beam-steering engine as defined in claim 2, wherein the optical element includes a polarization grating, in the first operational mode the polarization grating is configured to alter a polarization of the input light beam and alter a propagation angle thereof, wherein the first propagation direction forms a first non-nil angle with a direction of incidence of the input light beam on the polarization grating.

4. The light beam-steering engine as defined in claim 3, wherein the polarization grating in the second operational mode is configured to preserve a polarization of the input light beam incident on the polarization grating, wherein the second propagation direction defines a non-zero angle with the first propagation direction.

5. The light beam-steering engine as defined in claim 1, wherein the beam-steering engine is characterized by a contrast ratio that varies with a temperature of the beam-steering engine, the beam-steering engine further comprising: g. a device to control the temperature of the beam-steering engine to maintain the contrast ratio of the beam-steering engine above a certain limit, wherein the contrast ratio of the beam-steering engine characterizes a proportion of light energy input into the beam-steering engine that is deflected in a desired direction.

6. The light beam-steering engine as defined in claim 5, wherein the contrast ratio decreases with an increasing temperature of the beam-steering engine.

7. The light beam-steering engine as defined in claim 5, wherein the device to control the temperature includes a cooling element.

8. The light beam-steering engine as defined in claim 7, wherein the cooling element is configured as a substantially transparent cooling layer and located relative to the optical element such that the light beam passes through the substantially transparent heating element.

9. The light beam-steering engine as defined in claim 7, wherein the cooling element includes a heat pump.

10. The light beam-steering engine as defined in claim 9, wherein the heat pump operates on the Peltier principle.

11. A LIDAR apparatus for scanning a scene, comprising:
a. a transmitter stage for generating a light beam,
b. a receiver stage,
c. a beam-steering engine configured to steer the light beam received from the transmitter stage to scan at least a portion of the scene, the beam-steering engine including an optical component, the beam-steering engine being responsive to steering commands to steer the light beam by performing an angular deflection of the light beam in discrete steps within a steering range, a periodic profile of the optical component being electrically controlled to be switchable between operational modes corresponding to different light propagation directions by the beam-steering engine without mechanical movement of the optical element,
d. a controller for generating the steering commands in response to a control signal, wherein each of the steering commands includes a dwell time that defines a time period for the optical component to operate in one operational mode.

12. The LIDAR apparatus as defined in claim 11, wherein the dwell time includes a transition time period indicative of a transition time for the optical component to switch from the one operational mode to the other.

13. The LIDAR apparatus as defined in claim 12, wherein the transition time period is indicative of a liquid-crystal relaxation time.

14. The LIDAR apparatus as defined in claim 12, further comprising a timer, wherein the timer is configured for measuring the transition time period for the optical component to switch from the one operational mode to the other.

15. The LIDAR apparatus as defined in claim 12, wherein the transition time period includes a switching-on time.

16. The LIDAR apparatus as defined in claim 11, further comprising a sensor, wherein the sensor includes a light source and a light detector, the light detector configured to sense an optical signal generated by the light source, the light source and the light detector being located on either side of the optical element.

17. The LIDAR apparatus as defined in claim 11, wherein the periodic profile of the optical component is controlled by a voltage.

18. The LIDAR apparatus as defined in claim 11, wherein the steering commands are determined by active tiles specified in an operational profile of the LIDAR apparatus.

19. The LIDAR apparatus as defined in claim 11, wherein the dwell time depends on a temperature of the beam-steering engine.

20. The LIDAR apparatus as defined in claim 11, wherein the steering commands run continuously until a new control signal is received.

* * * * *